(12) United States Patent
Riedel

(10) Patent No.: US 12,468,828 B2
(45) Date of Patent: Nov. 11, 2025

(54) METHOD AND COMPUTING DEVICE FOR INTERVENING ACCESS TO A TARGET MEDIA SERVICE

(71) Applicant: riedel.wtf GmbH, Berlin (DE)

(72) Inventor: Frederik Riedel, Berlin (DE)

(73) Assignee: RIEDEL.WTF GMBH, Berlin (DE)

( * ) Notice: Subject to any disclaimer, the term of this patent is extended or adjusted under 35 U.S.C. 154(b) by 594 days.

(21) Appl. No.: 17/931,047

(22) Filed: Sep. 9, 2022

(65) Prior Publication Data

US 2023/0229797 A1    Jul. 20, 2023

(51) Int. Cl.
*G06F 21/62* (2013.01)
*G06F 11/34* (2006.01)
*H04M 1/72463* (2021.01)

(52) U.S. Cl.
CPC ...... *G06F 21/6209* (2013.01); *G06F 11/3438* (2013.01); *H04M 1/72463* (2021.01)

(58) Field of Classification Search
None
See application file for complete search history.

(56) References Cited

U.S. PATENT DOCUMENTS

| | | | | |
|---|---|---|---|---|
| 11,627,215 | B1 * | 4/2023 | Puvvula | H04L 67/306 715/741 |
| 2016/0142559 | A1 * | 5/2016 | Pollak | H04M 15/853 455/406 |
| 2018/0343266 | A1 * | 11/2018 | Lotter | H04L 67/535 |
| 2019/0220290 | A1 * | 7/2019 | Yu | G06F 3/04847 |
| 2019/0260872 | A1 * | 8/2019 | Lee | H04L 67/535 |
| 2019/0347181 | A1 * | 11/2019 | Cranfill | G06F 11/3013 |
| 2022/0300665 | A1 * | 9/2022 | Xu | G06Q 10/109 |

OTHER PUBLICATIONS

App Store Preview, Forest: Focus for Productivity, Seekrtech Co, Ltd., accessed Nov. 2, 2022, 4 pages.
App Store Preview, ScreenZen—Screen Time Control, ScreenZen LLC, accessed Nov. 2, 2022, 3 pages.
Freedom, Features to help you do what you love., https://freedom.to/features, accessed Nov. 2, 2022, 4 pages.
Gruening, David J. et al., Directing smart-phone use via one sec: Testing a self-nudge app in the wild, Psychology Department, Heidelberg University, Center for Adaptive Rationality, Berlin, Germany, Jul. 26, 2022; https://doi.org/10.31234/osf.io/nwuar, 33 pages.
Haynes, Dopamine, Smartphones & You: A battle for your time, Harvard University SITN—Blog, May 1, 2018, 6 pages.
Opal, Real Focus, in Real-Time, www.opal.so, accessed Nov. 2, 2022, 10 pages.
Riedel.wtf GmbH, one sec Break free from social media distractions—in the long term, https://one-sec.app, accessed Nov. 2, 2022, 19 pages.
Sneed, Annie, I'm addicted to my phone. How can I cut back?, Technology, The Seattle Times, Feb. 15, 2022, 4 pages.
Welch, Chris, Apple iOS 12: the biggest new features coming to the iPhone, The Verge, Tech—Apple—WWDC, Jun. 12, 2018, 15 pages.

* cited by examiner

*Primary Examiner* — Christopher J Fibbi
(74) *Attorney, Agent, or Firm* — HAYES SOLOWAY P.C.

(57) ABSTRACT

The present invention relates to a computer-implemented method to intervene access to a target media service requested by a user as well as a computing device including processor and memory. The computing device includes computer-executable program instructions that, when executed by the computing device, performs one or more methods to intervene access to a target media service requested by a user.

33 Claims, 12 Drawing Sheets

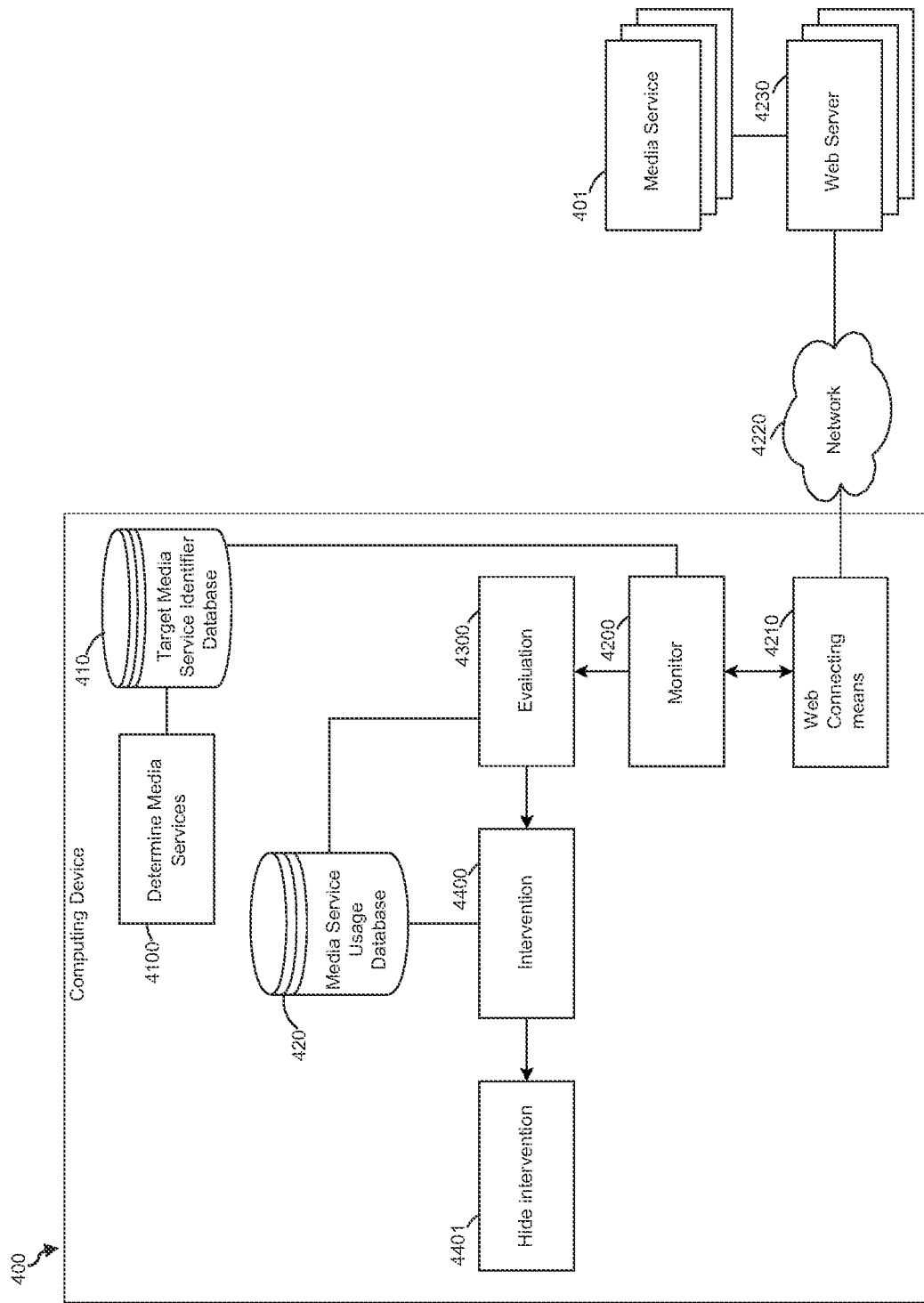

METHOD AND COMPUTING DEVICE FOR INTERVENING ACCESS TO A TARGET MEDIA SERVICE

FIELD OF INVENTION

The present invention relates to a computer-implemented method to intervene access to a target media service requested by a user as well as a computing device including processor and memory, wherein the computing device includes computer-executable program instructions that, when executed by the computing device, performs a method to intervene access to a target media service requested by a user comprising steps.

BACKGROUND

Social media platforms (such as TikTok, Twitter or Instagram) are designed to make money by selling advertisements. Essentially, they sell user's attention to companies who want to advertise their products. In this regard social media platforms are driven by maximizing the number of active users and the screen-time of the user for the respective apps. In other words, it is the intention of such social media platforms to make the user spend a long time actively using the service and/or make the user open the service regularly in order to achieve the maximizations.

In this regard, such media services use different psychological strategies in order to increase the chance that the user stays longer actively involved and/or opens the service regularly. For example, the user regularly wants to see what is new, what has happened, who has sent messages etc., as each time the brain is fed with small-dopamine shots, which are released from the body when receiving a response from the media service, such as receiving a small red indicators, showing the user that someone liked, commented, or messaged the user.

Dopamine is a well-known neurotransmitter that is produced in the substantia nigra, ventral tegmental area, and hypothalamus of the brain. Studies have shown that in case the dopamine transmission system is dysfunctional different nervous system diseases, such as Parkinson's disease can result. Moreover, it is known that the level of dopamine transmission increases in response to any type of reward and by a large number of strongly addictive drugs. As long as the dopamine level is increased, the person experiences a better mood, such as an increase in happiness. When the dopamine level decreases, the happiness generally decreases.

Accordingly, the response information provided by the respective media services acts like a reward, which triggers the endogenous release of dopamine so that the user of the media service directly experiences a better mood. Analogous to the consumption of addictive drugs, the user of such media services seeks to experience the better mood more and more often so that subconsciously the screen-time of a user for the respective media service and/or the number of access requests for the respective media services increases.

The problem is known, e.g., as "smart phone addiction" and discussed regularly in the public (see in particular Trevor Haynes, Harvard University, May 1, 2018, BLOG "Dopamine, Smartphones & You: A battle for your time", sitn.hms.harvard.edu/flash/2018/dopamine-smartphones-battle-time/; Annie Sneed, The New York Time, Feb. 8, 2022, "I'm Addicted to My Phone. How Can I Cut Back?"). In this regard, Chamath Palihapitiya, former Vice President of User Growth at Facebook, explained to an audience of Stanford students "The short-term, dopamine-driven feedback loops that we have created are destroying how society works" (see Trevor Haynes ibid). A growing number of mental health specialists may regard such smartphone overuse as an addiction; however, smartphone overuse is presently not recognized as an addition in the official manual of mental disorders published by the American Psychiatric Association (see Annie Sneed ibid). Regardless of how the problem is actually named, smartphone screen-time overuse leads to an increased engagement with the smartphone leaving less time for the user to do other things and may increase a short-term well-being, wherein abstinence of the smartphone may increase the well-being.

In any case, experts recommend reducing smartphone use by either drastically taking a "screen fast", setting rules around daily smartphone use, and making the smartphone less appealing (see Annie Sneed ibid). The ever more sophisticated feedback loops of the media service providers, however, may counteract the personal adherence to rules around daily smartphone use.

In this regard, the industry has identified a new business field and provides technical solutions.

A first application service was released May 10, 2014, by SEEKRTECH CO., LTD. under the name Forest—Your Focus Motivation. After installation of this application service on the smartphone, the app lets a tree grow as long as the service is open. In case the application service is closed, the tree dies. This arrangement forces the user to keep this application service open, which means that the user cannot use at the same time any other application service, whether good applications or bad ones.

For example, Apple Inc. first released with iOS 12 on Sep. 17, 2018 the services "Apple Screen Time". This service may meanwhile directly be installed in the operating system of the smartphone. The service is set up in such a way that the user can select a list of specific applications to which a screen time limitation shall be applied. As soon as the time limit is reached, a screen shield is provided, which informs users that they have reached the limit. The user then can select to accept or to ignore the limit. When selecting "ignore the limit" the user can select to extend the limit about "one more minute", receiving a reminder in 15 minutes or to "ignore the limit for today". As by using the respective selected applications within the time limit, which may be 1 hour, the user is confronted in this time with the respective feedback loops, which may increase the dopamine-level. Furthermore, as this intervention can be overcome so easily, the user may then select to ignore the time limit more often.

A third party application service to be installed on the smartphone is, e.g., provided by Opal OS Corporation (opal.so). This service was first released Oct. 12, 2020 and uses a local Virtual Private Network (VPN) in order to block certain Uniform Resource Locators (URLs) from loading so that certain application services cannot load fresh content. The VPN profile has to be installed on the operating system of the smartphone. After starting the VPN session, the user selects apps, the duration etc., so that in-session the respective application services are intercepted and cannot display fresh content. The solution provides the disadvantage that old, cached content is still available and that the application service still opens. Furthermore, the network traffic can be tracked and analysed, which may be bad for the user's privacy. An alternative solution using VPN approach is provided by Eighty Percent Solutions Corporation DBA Freedom.to (freedom.to), released Oct. 26, 2018, which similarly blocks websites and URLs from getting loaded.

On Sep. 29, 2020, version 1.0 of the application "one sec" was released by riedel.wtf GmbH (https://one-sec.app). This application is provided by the present inventor as a third party application to be installed on the smartphone. Version 1.0 provided a "Take a deep breath" intervention prior to opening the distracting application service in order to assist the user to make a conscious decision to open the identified application service and accordingly to reduce screen time. With version 1.3 released Jan. 5, 2021, the application included the feature of "intention tracking", wherein the user has to select the purpose to use the application to increase conscious thinking as to why the user wants to open the application service at this request. A copycat of the one sec application was released Sep. 16, 2021 as Screen Zen application provided by Screen Zen LLC. Instead of taking a deep breath, the intervention requires watching the creation of a round animation before the user can proceed to access the application service.

Despite the many options for a user to be assisted by the self-controlling of the screen-time of smartphones, some needs still are not met in practice.

In practice it has been shown that users may delete intervention methods from the computing device in case they experience interventions every time they access or switch to the identified application service within a short time interval. This includes also conscious short-term switches of the user from the identified application service to other websites/application services/calendar etc. in order to check an issue, which is used to complete a topic on the identified application service.

In addition, it has been shown in practice that users seek to control their screen usage patterns not only with respect to identified applications installed on their computing devices, but also at the same time to be able to control their screen time for web applications and/or websites accessed by their computing device. More preferably, they seek to use one intervention service running on all of their devices.

Moreover, it has been shown in practice that in case the intervention method is installed as a third party application service on the computing device or to be connected to the computing device, the intervention method may be delayed so that the identified service may be, e.g., visible for a short time to the user so that the user may recognize any rewards, which may induce the dopamine release.

In addition, it has been shown in practice that a user, who has completed an intervention, may nevertheless access the identified service in case the user finds no other alternative to be conducted.

Thus, a heretofore unaddressed need exists in the industry to address the aforementioned deficiencies and inadequacies.

SUMMARY OF INVENTION

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

A first aspect of the present invention may comprise a computer-implemented method to intervene access to a target media service requested by a user. The method may comprise:
a) providing a computing device including one or more computer storage databases and processors and wherein the computing device comprises computer-executable instructions embodied thereon including computer-executable instructions to carry out a method to intervene access to a target media service requested by a user,
b) determining a media service to be identified as target media service when access to the media service is to be intervened using the computing device of step a), storing unique target media service identifier data in an identifier database, and storing activity status data of the target media service including time stamp of access request to the target media service and time stamp of closing the target media service in a database as well as storing time stamp of completing intervention for the target media service in a database respectively,
c) detecting a user interaction with the computing device of step a) that triggers i) a present access request being a request to access a media service and determining that the requested access is a request to access one of the target media services based on the stored unique target media service identifier data of step b), or ii) a request to close a media service and determining that the requested closing is a request to close one of the target media services based on the stored unique target media service identifier data of step b),
d) determining that the present access request to the target media service of step c) is to be intervened based on the activity status data for the requested target media service, wherein the present access request to the target media service is not to be intervened i) when determining that a time interval between the time stamp of the present access request for the target media service and a time stamp of completion of last intervention for the target media service is up to 10 seconds, and ii) when determining that a time interval between the time stamp of the present access request for the target media service and a time stamp of last closing the target media service is up to 5 minutes,
wherein the time stamp of the present access request for the target media service is only stored in a database in case the access to the target media service is determined to be intervened, and
e) intervening access to the requested target media service, wherein the intervention is perceivable by the user and is selected from a predetermined intervention parameter stored for the requested target media service on or accessible by the computing device.

A second aspect of the present invention can comprise a computer-implemented method to intervene access to a target media service requested by a user. The method may comprise:
a) providing a computing device including one or more computer storage databases and processors, and wherein the computing device comprises computer-executable instructions embodied thereon and wherein computer-executable instructions stored in a non-transitory memory of the computing device are executable by the processors to carry out the method to intervene access to a target media service requested by a user with an operating system of the computing device,
b) determining a media service to be identified as target media service when access to the media service is to be intervened using the computing device of step a), storing unique target media service identifier data in an identifier database, and storing activity status data of the target media service including time stamp of access request to the target media service in a database as well as storing time stamp of completing intervention for the target media service in a database respectively, c) detecting a user interaction that triggers a present access request, the present access request being a request of the computing device to access a media service and determining that the requested access is a request to access one of the target media services based on the stored unique target media service identifier data of step b), d) determining that the present access request to the target media service of step c) is to be intervened based on the activity status data, wherein the present access request to the target media service is not to be intervened when determining that a time interval between the time stamp of the present access request for the target media service and a time stamp of completion of last intervention for the target media service is up to 10 seconds, Wherein the time stamp of the present access request for the target media service is only stored in a database in case the access to the target media service is determined to be intervened, and e) intervening access to the requested target media service, wherein the intervention is perceivable by the user and is selected from a predetermined intervention parameter stored for the requested target media service on or accessible by the computing device.

A third aspect of the present invention can comprise a computing device including processor and memory, wherein the computing device comprises computer-executable program instructions embodied on the computing device that, when executed by the computing device, performs a method to intervene access to a target media service requested by a user according to the inventive aspects including the first and second aspects of the present invention.

The inventive aspects of the present invention as disclosed hereinbefore can comprise any possible (sub-)combination of the feature combination, in particular as set out in the dependent claims or as disclosed in the following detailed description and/or in the accompanying figures, provided the resulting combination of features is reasonable to a person skilled in the art.

BRIEF DESCRIPTION OF DRAWINGS

Further aspects and characteristics of the invention will ensue from the following description of the embodiments with reference to the accompanying drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a simplified diagram of an extract of an exemplary computing environment suitable for implementing embodiments of the invention relating to providing a target media service by a web server.

DETAILED DESCRIPTION OF EMBODIMENTS

Figure 1:
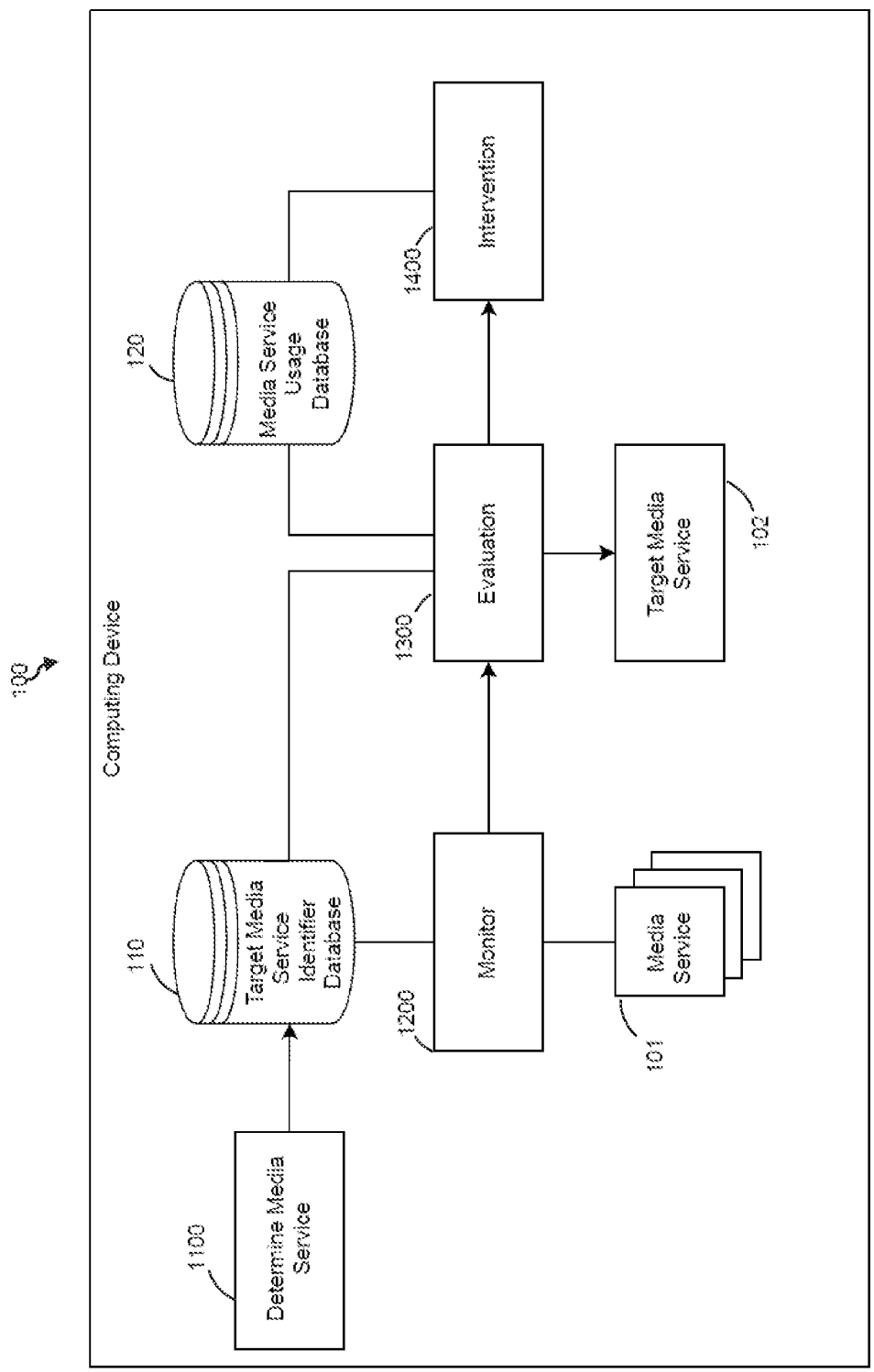
FIG. 1 is a simplified diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies.

As set out in more detail hereinafter, the inventor of the different aspects of the present invention has found out that intervention methods and systems of the present invention overcome one or more of the needs of the prior art.

Aspects of the present invention may reduce deleting intervention services from a computing system by a user, because the intervention method according to the present aspects may prevent launching intervention service i) when determining that a time interval between the time stamp of the present access request for the target media service and a time stamp of completion of last intervention for the target media service is up to 10 seconds, and ii) when determining that a time interval between the time stamp of the present access request for the target media service and a time stamp of last closing the target media service is up to 5 minutes. This aspect, thus, enables a user to use the target media service and to conduct a conscious short-term switch to another service in order to, e.g., check some information in order to complete a topic on the identified application service.

Aspects of the present invention may in addition provide a solution to intervene not only target media services on the computing device, but also network-based, in particular web-based target media services accessible by suitable connection means of the computing device using networks. In case such a target media service (synonym: "web target media service") may be provided by a respective network, such as the internet/a web server/a cloud network etc. (synonym: "web device"), these web devices do not provide any data according to which closing of the web target media service can be detected. To overcome this shortage, the present invention solves the problem differently. The intervention method of the present invention provides a computing device, which may be configured to detect use of the web target media service by the user and may, thus, generate and store one or more respective time stamps for the duration of detected use (synonymous: "in-use time stamps"). In case the user stops using the web target media service, the computing device may not detect any continued use of the web target media service and may, thus, not generate a further time stamp. In order to determine the time stamp of closing the web target media service, the intervention method of the present invention may, thus, determine the last in-use time stamp of a sequence stored for a web target media service to represent the time stamp of closing the web target media service. The last in-use time stamp of a sequence may also be determined as the last in-use time stamp of a sequence being also the last in-use time stamp prior to a predetermined time-out interval. Such an inventive aspect may improve users' control of their screen usage patterns for target media services being present on the computing device or being provided, e.g., by the internet/a web server/a cloud network and being accessible by the computing device via suitable network connection devices, such as an application displaying content provided or streamed by a web server, a web viewing device, or a web browser. Suitable target media services provided by the internet/a web server/a cloud network may include, e.g. web applications and/or websites.

According to further aspects of the present invention, the intervention method may be provided by an operating system of the computing device. Such a solution does not require that the intervention method service must be installed prior to its use, which may require a detailed set up for configuring the intervention method service. In other words, the user does not need to program the intervention method configuration. Moreover, the performance of the intervention method, such as speed of launching the intervention method, is increased thereby increasing efficacy by reducing short perceptions of the requested target media service, which may be perceived when using third party intervention methods. Thus, also the risk of experiencing a dopamine released as response to the short time view is reduced. Furthermore, the intervention method provided by the operating system is not only quicker but also less energy consuming, so that the battery storage may last longer.

Aspects of the present invention using an operating system for carrying out the intervention method may in addition provide a solution to synchronously controlling intervention of target media services on different computing devices having the same operating system or wherein the operating systems of the different computing devices connect and communicate with each other, e.g. including cross device synchronisation for iOS, iPadOS, macOS, watchOS, or synchronisation to Android and Windows computing devices. The user may, thus, not circumvent the intervention method by switching to an alternative device. When incorporating the inventive intervention method already in the operating system, energy and time for launching the intervention method may be reduced. As an example, the intervention method may be launched prior to displaying the requested target media service, e.g. on a screen. In such a case, the user may not perceive any rewards etc. provided by the target media service and accordingly, the dopamine release in response to rewards may not be triggered in the user. The use of an intervention method provided by the operating system of the computing device may also allow animated interventions. Moreover, interventions may also be displayed on top of target media services provided by the internet/a web server/a cloud network, such as web applications and/or web sites. As an alternative, the inventive method may be displayed as a banner above the display of the requested target media service.

Aspects of the present invention using an operating system for carrying out the intervention method may in addition identify predetermined accounts and/or predetermined parts of target media services as target media service, at least for a predetermined time interval of the day, a predetermined location and/or a predetermined focus mode. Such an embodiment, e.g., enables selecting accounts/target media services which shall only in part or not at all be accessible during worktime or which shall only be accessible without intervention during worktime. As an example, only the messaging feature or features relating to a selected intention of the user may be accessible without intervention.

Aspects of the present invention using an operating system for carrying out the intervention method may in addition increase the hurdle to find workaround solutions for the user and/or disabling the intervention method by the user due to the set up within the operating system. As an example, a user may not skip, disable or delete the intervention method.

Aspects of the present invention using an operating system for carrying out the intervention method may in addition provide in-use interventions after a predetermined time. Such a repeating intervention may increase conscious thinking of users whether they still want to continue using the target media service. This may in turn reduce the screen time of target media services by the user.

Aspects of the present invention using an operating system for carrying out the intervention method may in addition disable connections to further devices, in particular to the internet/a web server/a cloud network, in order to prevent loading of new content of a requested target media service after a predetermined time.

Aspects of the present invention using an operating system for carrying out the intervention method may in addition recommend one or more media services or one or more media service categories to be identified as target media service based on general information or on user patterns. In such a case, the user does not have to select the respective target media services and saves time. Furthermore, users cannot cheat to themselves by avoiding one or more media services to be identified as target media service.

Aspects of the present invention using an operating system for carrying out the intervention method may in addition provide a selection of predetermined healthy media services after completing the intervention. In such a case, the user does not have to list healthy media services previously and, thus, saves time. Moreover, the operating system may recommend a personalized healthy media service based on the usage patterns of the user. In view of such a provision by the operating system, the user may furthermore be inclined to dismiss launching the target media service after having experienced the intervention and selecting the healthy media service instead. Such a healthy media service may, e.g., be chosen from a selection of a predetermined list of media services relating to sports performed by the user, hobbies performed by the user, actions of wellbeing performed by the user. The operating system may further be configured to determine the proposed healthy media service from the list of predetermined services further based on time of the day and/or location and/or requested target media service. In addition or alternatively, the operating system may recommend to a user having dismissed or completed an intervention step a predetermined healthy activity to be performed by the user instead of accessing the target media service. Such healthy activity may relate to a predetermined listing of one a sporting activity for a user, a hobby activity for a user, a wellbeing activity for a user, a photographic file of a user or a collection thereof, a video file of a user or a collection thereof, a personal contact of a user to be contacted, such as a contact, who is identified as close contact, but has not been contacted within a predetermined time, a list of calendar events, a list of reminder to-does, etc.

Aspects of the present invention using an operating system for carrying out the inventive intervention method may in addition use an app extension program instruction to select or to connect to a media service directly for use as part of the intervention. This aspect allows changing the intervention services and, thus, to incline the user not to dismiss the intervention method.

Aspects of the present invention using an operating system for carrying out the inventive intervention method may in addition determine intervening access to the requested target media service in step d) based on tracking data of user's usage patterns of media services including target media services. Such a solution may be able to identify usage patterns of users dependent on daytime and/or location and/or dependent on their focus mode.

Aspects of the present invention using an operating system for carrying out the inventive intervention method may in addition detect the health data of a user based on sensor data of the computing device and/or based on input data, including detecting stress, and mental health, such as anxiety or depression, and to determine intervention of requested access to target media service based on the detected health status.

The present inventor has cooperated with the Psychology Department at Heidelberg University (Germany) and the Center for Adaptive Rationality, Max-Planck Institute Berlin (Germany) together in order to test the self-nudge inventive method (see, Grüning David J, Riedel F, Lorenz-Spreen P, "Directing smart-phone use via one sec: Testing a self-nudge app in the wild", preprint: 10.31234/osf.io/nwuar, which is incorporated herein in its entirety). The cooperation included a test on an aspect of the present invention providing an intervention method that is installed by the user to its computing device in order to reduce the mindless use of a certain "target media services", e.g., social media services on the smartphone. The intervention method was tested by collecting behavioural user data about those opening attempts for 280 participants, who were using an aspect of the inventive intervention method for six weeks, and two surveys were conducted before and after the intervention span. The aspects of the present invention helped participants reduce their target media service usage in two ways. First, on average in 36% of the times participants attempted opening a target media service, they closed that service again after they perceived the launch of the intervention method, e.g. by seeing a pop-up. Second, over the course of six weeks, users did reduce attempting to open the target media service in the first place, resulting in 37% less overall attempts. In sum, aspects of the present invention decreased the actual opening of target media services by 57% after six consecutive weeks. Participants reported spending less time with their apps and being happier with their app use after six weeks of using aspects of the inventive method. Importantly, users seemed to also use their apps more deliberately by self-reporting their app consumption to be less problematic. Thus, it is shown that aspects of the intervention method according to the present invention significantly reduce the actual use of the target media service once requested and furthermore reduce the actual number of requests to access target media services.

As used herein, the terms "may", "can", "is able", "could" etc. used in relation to the present invention denote those embodiments in which the corresponding features may, but need not, be included. At the same time, these terms also encompass the state in which the correspondingly designated features are contained in the embodiments.

As used herein, the expression "computing device comprising one or more computer storage databases and processors respectively comprising computer-executable instructions embodied thereon" relates to a computing device, wherein part of or all of the one or more computer storage databases and/or the one or more processors are comprised within the hardware of the computing device or can connect and communicate with the computing device, e.g. connect and communicate via suitable tangible and intangible/wireless communication forms such as via Universal Serial Bus (USB), Local Area Network (LAN), Wireless Local Area Network (WLAN), Near-Field Communication (NFC), Bluetooth, Global Positioning System (GPS).

As used herein, the expression "time stamp of access request to the target media service" relates to data identifying the point in time at which a user interaction triggers access request to the target media service. In addition, the expression "time stamp of the present access request to the target media service" relates to data identifying the point in time at which a user interaction triggers access request to the target media service in step c) for which it is determined whether an intervention is to be carried out in step d) of the inventive method. Furthermore, the expression "time stamp of last access request to the target media service" relates to data identifying the point in time at which a user interaction last triggered access request to the target media service prior to the detection method of step c). In general, the time stamp is stored in a suitable database. Such a storing of time stamp is useful in case a statistical overview of the intervention method shall be provided to the user. Such a statistical overview may further visualize the user's media service usage patterns and may function as a further control in order to reduce the screen time.

As used herein, the expression "time stamp of closing the target media service" relates to data identifying the point in time at which the target media service is last perceptible for a user on the computing device or a device accessed by the computing device. In addition, the expression "time stamp of last closing the target media service" relates to data identifying the point in time at which the target media service is last perceptible for a user on the computing device or a device accessed by the computing device prior to the detection in step c). As an example, in case the target media service is visually perceptible by the user, the data relates to the time at which the target media service was last visible for a user either on the computing device itself or on a display device connected to the computing device. In particular, in case the target media service is displayed on a screen, the user may close the target media service by putting the target media screen into the background of the display, which means that the screen does not visibly display the target media service for the user, alternatively or in addition the user may interact with the computing device in order to stop executing the target media service. In general, the time stamp is stored in a suitable database. Such a storing of time stamp is useful in case a statistical overview of the intervention method shall be provided to the user. Such a statistical overview may further visualize the user's media service usage patterns and may function as a further control in order to reduce the screen time.

As used herein, the expression "time stamp of completing intervention for the target media service" relates to data identifying the point in time at which the completed intervention is last perceptible for a user on the computing device or a device accessed by the computing device. Furthermore, the expression "time stamp of last completing intervention for the target media service" relates to data identifying the point in time at which the last intervention prior to the detection in step c) was last perceptible for a user on the computing device or a device accessed by the computing device. As an example, in case the intervention is visually perceptible by the user, the data relates to the time at which the intervention was last visible for a user either on the computing device itself or on a display device connected to the computing device. In general, the time stamp is stored in a suitable database. Such a storing of time stamp is useful in case a statistical overview of the intervention method shall be provided to the user. Such a statistical overview may further visualize the user's media service usage patterns and may function as a further control in order to reduce the screen time.

As used herein, the expression "time interval between the time stamp of the present access request for the target media service and a time stamp of completion of last intervention for the target media service is up to 10 seconds" relates to the absolute time between the data of time stamp of the present access request for the target media service by a user and the stored data of time stamp of completion of last intervention for the target media service.

As used herein, the expression "time interval between the time stamp of the present access request for the target media service and a time stamp of last closing the target media service is up to 5 minutes" relates to the absolute time between the data of time stamp of the present access request for the target media service by a user and the stored data of time stamp of last closing the target media service.

As used herein, the expression "intervening access to the requested target media service, wherein the intervention is perceivable by the user and is selected from predetermined intervention parameter stored for the requested target media service on or accessible by the computing device" relates to executing program instructions for launching the intervention to be perceivable by a user according to a predetermined intervention parameter stored with respect to the target media service.

As used herein, the expression "time stamp of dismissal of intervention for the requested target media service" relates to data identifying the point in time at which the user triggers a request to abort launching the intervention or abort a currently running intervention. Such a storing of time stamp is useful in case a statistical overview of the intervention method shall be provided to the user. Such a statistical overview may further visualize the user's media service usage patterns and may function as a further control in order to reduce the screen time.

As used herein, the expression "time stamp of closing the target media service provided by a web server represents the last time stamp of conducting the target media service" (synonymous: "time stamp of closing the target media service provided by a web server represents the last in-use time stamp of the target media service") means that the time of closing the target media service on the internet/the web server/the cloud network may be represented by determining the last data point/time stamp generated by the inventive computing device for confirmed launch/use of the target media service by the user (synonymous: "in-use data point"/ "in-use time stamp"). Such a representation of a closing time stamp may not only be conducted with respect to target media services provided by a web server, but may also be conducted with respect to other target media services, such as provided by the computing device or a connected computing device. Such a storing of time stamp is useful in case a statistical overview of the intervention method shall be provided to the user. Such a statistical overview may further visualize the user's media service usage patterns and may function as a further control in order to reduce the screen time.

According to a first aspect of the present invention, there is provided a computer-implemented method to intervene access to a target media service requested by a user.

The method may comprise the step a) of providing a computing device including one or more computer storage databases and processors and wherein the computing device comprises computer-executable instructions embodied thereon. The computing device may comprise computer-executable instructions to carry out a method to intervene access to a target media service requested by a user. The computer-executable instructions may, at least in part, be comprised within the computing device or be accessible by the computing device. In other words, the computer-executable instructions to carry out the intervention method may be comprised on the computing device itself, e.g. as part of one or more application services, or as part of the operating system, or may be accessible by the computing device using a suitable connection and communication system, such as suitable connections and communications to a further computing device and/or a web server or a cloud system. The requested target media service may, at least in part, be comprised within the computing device or be accessible by the computing device by suitable connections and communications. In other words, the target media service may be comprised on the computing device itself, e.g. as part of one or more application services, or as part of the operating system, or may be accessible by the computing device using a suitable connection and communication system, such as suitable connections and communications to a further computing device and/or a web server or a cloud system.

The method may further comprise the step b) of determining a media service to be identified as target media service in case access to the media service shall be intervened using the computing device of step a). In other words, a media service is determined to represent a target media service based on instructions provided by a user and/or a computing device and/or an external instruction to intervene access to the respective media service in order to assist controlling user's usage pattern of the requested target media service and thereby reducing user's screen time of the target media service. In case a media service is accordingly identified as target media service, unique target media service identifier data may be stored in an identifier database. In other words, a list of one or more target media services may be set up, wherein the unique target media service identifier data serves as reference data. The computing device may also be configured to store activity status data of the target media service including time stamp of an access request to the target media service and time stamp of closing the target media service in a database as well as to store a time stamp of completing intervention for the target media service in a database. In order to correlate the respective time stamps to the respective target media services, the respective time stamps are generally stored together with the respective unique target media service identifiers.

The method may further comprise the step c) of detecting a user interaction with the computing device of step a) that triggers i) a request to access a media service or that may trigger ii) a request to close a media service. The detected access request may further trigger determining that the requested access is a request to access one of the target media services based on the stored unique target media service identifier data of step b). Such an access request to a target media service may also be called "present access request" and the activity status may be called "activity status open", "activity status opened" or only "opened". The detected closing request may further trigger determination that the requested closing of the user requested media service is a request to close one of the target media services based on the stored unique target media service identifier data of step b). Such a closing request to a target media service may also be called "present closing request" and the activity status may be called "activity status close", "activity status closed" or only "closed". The determination step may include a method step wherein the computing device compares the identifier data of the media service requested by the user with the list of unique target media service identifiers. In case the data match, the user requested media service is determined as a target media service.

The method may further comprise the step d) of determining that the present access request to the target media service of step c) is to be intervened based on the activity status data for the requested target media service. In other words, an evaluation is first conducted, whether the activity status of the requested target media service is opened or closed detected in step c). In case the activity status of the requested target media service is opened, the access to the target media service may generally be intervened. The evaluation step e) further includes determining when the present access request to the target media service may not be intervened. In this regard, the present access request may not be intervened when determining that a time interval between the time stamp of the present access request for the target media service and a time stamp of completion of last intervention for the target media service is up to 10 seconds, up to 5 seconds, up to 3 seconds, or up to 1 second. In other words, the evaluation result of not conducting the intervention method step when a short time interval between the present access request and completion of last intervention applies represents the case that the user has just completed the intervention method step d) and after completed invention decides to access (nevertheless) the target media service. This decision to access the target media service after completion of intervention generally may be detected as a (new) request to access the target media service according to step c) so that in the subsequent evaluation step d) the inventive method determines to not carry out a subsequent intervention method and instead grants access to the requested target media service. In addition, the present access request may not be intervened when determining that a time interval between the time stamp of the present access request for the target media service and a time stamp of last closing the target media service is up to 5 minutes, or is up to 3 minutes, or is up to 1 minute. In other words, this proviso reflects the situation, wherein a user already used the target media service, switched to another service and returns back to the target media service within a short time interval of up to 5 minutes, or up to 3 minutes, or up to 1 minute. Such a usage pattern may be the case when a user consciously switches from the used target media service to another service, such as the calendar or map service in order to check some information and returns back to the target media service in order to finalize a task, such as proposing a time or place to meet. Such a conscious usage pattern shall not be intervened using the present invention in order to reduce causes for deleting the intervention method by a user. In case the evaluation step d) determines that the present access request is not to be intervened, the time stamp of the present access request for the target media service is not stored in the respective database. In other words, only in case the evaluation step d) determines that the present access request is to be intervened, the time stamp of the present access request for the target media service is stored in a database. The evaluation step d) may include further requirements for determining whether an intervention shall be carried out or not as set out below.

The method may further comprise the step e) of intervening access to the requested target media service, wherein the intervention is perceivable by the user and is selected from predetermined intervention parameter stored for the requested target media service on or accessible by the computing device. The intervention step e) facilitates that the user is at least interrupted from perceiving the requested target media service. In other words, in case the intervention method may be stored as a third party application on the computing device, there may be a time delay in order to carry out the intervention step. In this regard, the user may shortly perceive part of the target media service, but the perception is within a short time, e.g. less than up to 5 seconds, or up to 3 seconds, or up to 1 second interrupted by the intervention method. The kind of intervention method is selected from predetermined intervention parameter. In other words, the intervention of step e) can be the same or different for the respective target media services. Furthermore, the intervention of step e) for a requested target media service may vary dependent on certain further requirements as set out further below.

According to a further alternative embodiment of the first aspect of the invention, the method may comprise a step, wherein the operating system of the computing device comprises the instructions to carry out the intervention method.

According to a further alternative embodiment of the first aspect of the invention, the method may comprise a step, wherein the instructions to carry out the intervention method are comprised in an application installed on the computing device.

According to a further alternative embodiment of the first aspect of the invention, the method may comprise a step, wherein the instructions to carry out the intervention method are comprised on a web server which is accessible by the computing device.

According to a further alternative embodiment of the first aspect of the invention, the method may comprise a step, wherein the instructions to carry out the intervention method are comprised in the target media service as such.

According to a second aspect of the present invention, there is provided an alternative computer-implemented method to intervene access to a target media service requested by a user.

The method may comprise the step a) of providing a computing device including one or more computer databases and processors and wherein the computing device comprises computer-executable instructions embodied thereon. The computer-executable instructions to carry out the method to intervene access to a target media service requested by a user may be comprised in an operating system of the computing device. In other words, the operating system of the computing device may be configured to carry out the intervention method of the present invention. Such an embodiment may have the aforementioned advantages.

The method may further comprise the step b) of determining a media service to be identified as target media service in case access to the media service shall be intervened using the computing device of step a). In other words, a media service is determined to represent a target media service based on instructions provided by a user and/or a computing device and/or an external instruction to intervene access to the respective media service in order to assist controlling user's usage pattern of the requested target media service and thereby reducing user's screen time of the target media service. In case a media service is accordingly identified as target media service, unique target media service identifier data is stored in an identifier database. In other words, a list of one or more target media services is set up, wherein the unique target media service identifier data serves as reference data. The operating system of the computing device may also be configured to store activity status data of the target media service including time stamp of an access request to the target media service and time stamp of closing the target media service in a database as well as to store a time stamp of completing intervention for the target media service in a database. In an alternative embodiment the data may be stored in such a way that the data may be accessible by the operating system. In order to correlate the respective time stamps to the respective target media services, the respective time stamps are generally stored together with the respective unique target media service identifiers. As an example, the operating system of the computing device may be configured to determine one or more media services or one or more media service categories to be identified as target media service based on general categories, such as identification as social media service or based on usage patterns of a user, wherein the usage patterns may relate to a predetermined screen time usage of a user detected by the operating system.

The method may further comprise the step c) of detecting a user interaction with the computing device that triggers a request to access a media service. The detected access request may trigger determining that the requested access is a request to access one of the target media services based on the stored unique target media service identifier data of step b). Such an access request to a target media service may also be called "present access request" and the activity status may be called "activity status open", "activity status opened" or only "opened". The determination step may be conducted by the operating system and may include a method step wherein the operating system of the computing device compares the identifier data of the media service requested by the user with the list of unique target media service identifiers. In case the data matches, the user requested media service is determined as a target media service.

The method may further comprise the step d) of determining that the present access request to the target media service of step c) is to be intervened based on the activity status data for the requested target media service. In other words, an evaluation is first conducted, whether the activity status of the requested target media service is opened in step c). In case the activity status of the requested target media service is opened, the access to the target media service may generally be intervened. The evaluation step e) further includes determining when the present access request to the target media service is not to be intervened. In this regard, the present access request is not to be intervened when determining that a time interval between the time stamp of the present access request for the target media service and a time stamp of completion of last intervention for the target media service is up to 10 seconds, up to 5 seconds, up to 3 seconds, or up to 1 second. In other words, the evaluation result of not conducting the intervention method step when a short time interval between present access request and completion of last intervention applies represents the case that the user has just completed the intervention method step d) and after completed invention decides to access (nevertheless) the target media service. This decision to access the target media service after completion of intervention generally may be detected as a (new) request to access the target media service according to step c) so that in the subsequent evaluation step d) the inventive method determines to not carry out a subsequent intervention method and instead grants access to the requested target media service. In case the evaluation step d) determines that the present access request is not to be intervened, the time stamp of the present access request for the target media service is not stored in the respective database. In other words, only in case the evaluation step d) determines that the present access request is to be intervened, the time stamp of the present access request for the target media service is stored in a database. The evaluation step d) may include further requirements for determining whether an intervention shall be carried out or not as set out below.

The method may further comprise the step e) of intervening access to the requested target media service, wherein the intervention is perceivable by the user and is selected from predetermined intervention parameter stored for the requested target media service on or accessible by the computing device. The intervention step e) facilitates that the user is at least interrupted from perceiving the requested target media service. Furthermore, the intervention of step e) for a requested target media service may vary dependent on certain further requirements as set out further below. In other words, in case the intervention method may be executed by the operating system, the intervention method may be optimized in such a way that the user may not perceive the requested target media service prior to perceiving the intervention method.

According to an alternative embodiment of the second aspect of the invention, method step c) may further comprise detecting a user interaction with the computing device that triggers a request to close a media service. The activity status data may include a time stamp of closing a media service, in particular a target media service. The detected closing request may trigger determination that the requested closing of the user requested media service is a request to close one of the target media services based on the stored unique target media service identifier data of step b). Such a closing request to a target media service may also be called "present closing request" and the activity status may be called "activity status close", "activity status closed" or only "closed". The determination step may be conducted by the operating system and may include a method step wherein the operating system of the computing device compares the identifier data of the media service requested by the user with the list of unique target media service identifiers. In case the data matches, the user requested media service is determined as a target media service.

According to a further alternative embodiment of the second aspect of the invention, the method of step e) may further include a determination that the present access request to the target media service in step d) is in addition not to be intervened when determining that a time interval between the time stamp of the present access request for the target media service and a time stamp of last closing the target media service is up to 5 minutes, or is up to 3 minutes, or is up to 1 minute. In addition, the present access request may not be intervened when determining that a time interval between the time stamp of the present access request for the target media service and a time stamp of last closing the target media service is up to 5 minutes, or is up to 3 minutes, or is up to 1 minute. In other words, this proviso reflects the situation, wherein a user already used the target media service, switched to another service and returns back to the target media service within a short time interval of up to 5 minutes, or up to 3 minutes, or up to 1 minute. Such a usage pattern may be the case when a user consciously switches from the used target media service to another service, such as the calendar or map service in order to check some information and returns back to the target media service in order to finalize a task, such as proposing a time or place to meet. Such a conscious usage pattern shall not be intervened using the present invention in order to reduce causes for deleting the intervention method by a user. In case the evaluation step d) determines that the present access request is not to be intervened, the time stamp of the present access request for the target media service is not stored in the respective database. In other words, only in case the evaluation step d) determines that the present access request is to be intervened, the time stamp of the present access request for the target media service is stored in a database. The evaluation step d) may include further requirements for determining whether an intervention shall be carried out or not as set out below.

According to a further alternative embodiment of the first or second aspect of the invention, the method may comprise a step, wherein the predetermined intervention parameter comprise data on the duration of an intervention in order to complete the intervention, data on a type of interaction for the user to be carried out in order to complete the intervention, data on a number of interaction types to be carried out by a user to complete the intervention, data whether a re-execution of intervention shall be scheduled when launching the target media service after completing the intervention step e), and data on if to block access to the requested target media service. As an example, the intervention may be a black screen, a screen including an instruction for the user, such as taking a breath, a service requiring interaction between the user and the computing device, such as that the user may follow a displayed sign with a finger on a screen, or such as that the user may rotate their device around a specified axis, a service confronting the user with a live video feed of the front-facing camera of the computing device, a service requiring the user to interact with hardware wirelessly communicating with the computing device (such as NFC or Bluetooth tags), the interaction may alternatively also require blocking access to the target media service.

According to a further alternative embodiment of the first or second aspect of the invention, the method may comprise a step, wherein determining that the intervention is to be carried out in step d) is additionally based on predetermined context data, wherein the context data includes i) predetermined location data of the computing device, ii) predetermined data of time of the day at the location of the computing device, iii) predetermined health data of the user, iv) predetermined data on performed actions of the user within a predefined time interval prior to the access request of step c), and/or v) predetermined focus mode.

As used herein, the expression "predetermined location data of the computing device" with respect to the context data may relate to the geographic position of the computing device, which may be assessed using suitable means included in the computing system, such as a Global Positioning System (GPS) means. This context data assigned to a target media service provides a further evaluation step in order to determine whether a target media service may be intervened or a special predetermined intervention parameter may be selected when a comparison of a detected position of the computing device matches with a predetermined location data of the computing device. As example, a predetermined location data of the computing device may be the geographic position of the work area so that in case the computing device is located in the area of the predetermined work area, the intervention for a respective assigned target media service shall or shall not be carried out or a specific predetermined intervention parameter may be selected.

As used herein, the expression "predetermined data of time of the day at the location of the computing device" (synonymous: "time of the day data") with respect to the context data may relate to a time interval of the day, which may be assessed using suitable means included in the computing system. This context data assigned to a target media service provides a further evaluation step in order to determine whether a target media service may be intervened or a special predetermined intervention parameter may be selected when a comparison of a detected time of the day at the location of the computing device matches with a predetermined time of the day data at the location of the computing device. As example, a predetermined time of the day data of the computing device may be the applicable working hours, such as 9 am to 5 pm, so that in case the detected time of the day at the location of the computing device is, e.g. 2 pm and, thus, within the predetermined time of the day data, the intervention for a respective assigned target media service shall or shall not be carried out or a specific predetermined intervention parameter may be selected.

As used herein, the expression "predetermined health data of the user" with respect to the context data may relate to a time interval of the day, which may be assessed using suitable means included in the computing system. This context data assigned to a target media service provides a further evaluation step in order to determine whether a target media service may be intervened or whether a specific predetermined intervention parameter may be selected when a comparison of the detected health data of the user matches with a predetermined health data of the user. As example, a predetermined health data of the user may be wake up time interval, such as 6 to 7 am, so that in case the detected time of wake up is, e.g. 6:30 am and, thus, within the predetermined health data, the intervention for a respective assigned target media service shall or shall not be carried out or a specific predetermined intervention parameter may be selected. In another example, in case the predetermined health data relates to jogging exercise and the computing device detects within the context data evaluation that the user has conducted a jogging exercise within a predetermined time interval prior to the present access request of a target media service, the evaluation step d) may result in either not conducting an intervention as a reward for conducting a healthy work out or may result in selecting a specific predetermined intervention parameter assigned to a respective healthy exercise, e.g. by reducing the duration of the intervention or by selecting a healthy media service as intervention etc. In addition, the health data may relate to the health status of a user based on sensor data of the computing device and/or based on other input data. The health status may include a detected stress level of a user, a detected mental health status of a user, such as anxiety or depression. In case the detected health data may match with a predetermined health data, the intervention for a respective assigned target media service shall or shall not be carried out or a specific predetermined intervention parameter may be selected. As the operating system may already provide means, such as a service for detecting wake up time, a fitness tracker for detecting jogging exercises, or other sensors for detecting the health status of a user, such an embodiment is used when the intervention method of the present invention is provided by the operating system.

According to a further alternative embodiment of the second aspect of the invention, the method may comprise a step, wherein the operating system of the computing device is configured to use embedded extensions to select or to connect to a healthy media service directly for use as part of the intervention.

As used herein, the expression "predetermined data on performed actions of the user within a predefined time interval prior to the access request of step c)" (synonymous: "performed action data") with respect to the context data may relate to a detectable action of the user performed within a predetermined time interval prior to the present access request of a target media service. This context data assigned to a target media service provides a further evaluation step in order to determine whether a target media service may be intervened or a special predetermined intervention parameter may be selected when a comparison of a detected actions performed by a user within a predefined time interval prior to the present access request matches with a predetermined performed action data. As example, a predetermined performed action data may be a phone call to a predetermined contact person (healthy contact), reading of a predetermined literature (healthy literature), etc. In case such a performed action is detected and matches with the predetermined performed actions, the intervention for a respective assigned target media service shall or shall not be carried out or a specific predetermined intervention parameter may be selected.

As used herein, the expression "predetermined focus mode" with respect to the context data may relate to a focus mode service provided by an operating system or installed as a separate application on a computing system. The focus mode relates to predetermined target media services, to which access request of a user may be intervened. The focus mode may be predetermined using input data of the user or may be predetermined by data provided by the operating system. This context data assigned to a target media service provides a further evaluation step in order to determine whether a target media service may be intervened or a special predetermined intervention parameter may be selected when a comparison of a detected focus mode matches with a predetermined focus mode data. As example, a predetermined focus mode data may be a selection of distracting target media services, such as WhatsApp, Instagram, TikTok, etc. In case such a request of such distracting target media services is detected and matches with the predetermined focus mode, such as work focus, the intervention for a respective assigned target media service shall or shall not be carried out or a specific predetermined intervention parameter may be selected.

Furthermore, in case the operating system of the computing device is configured to provide the intervention method of the present invention, the operating system may be configured to determine predetermined business accounts and/or predetermined messaging parts of target media services as the target media service, at least for a predetermined time interval of the day, a predetermined location and/or a predetermined focus modus as context data.

According to a further alternative embodiment of the first or second aspect of the invention, the method may comprise a step, wherein the computing device of step a) is further connected and in communication with a second computing device controlled by a second user (synonymous: "accountability buddy"). In step d) of the inventive method, the computing device communicates the present access request to the second computing device so that the second user as accountability buddy may be able to modify intervention parameters. In particular, the accountability buddy may be able to select as action confirming access to a requested target media service after completing intervention or may select as action confirming or rejecting disabling the intervention method from the computing device completely or temporarily. Such an embodiment may increase the social control and, thus, may reduce due to increased social pressure access requests to target media services. Such accountability buddies may, e.g., be parents, friends, colleagues, partners, relatives etc.

According to a further alternative embodiment of the first or second aspect of the invention, the method may comprise a step, wherein in step e) the perceivable intervention can be selected from i) displaying an intervention on the computing device or a device connected to the computing device, ii) playing back an audio file from the computing device or a device connected to the computing device, and iii) physically interacting the user and the computing device or a device connected and in communication with the computing device.

As used herein, the expression "displaying an intervention on the computing device or a device connected to the computing device" may relate to visually displaying the intervention on at least part of a screen of the computing device so that the user can visually perceive the intervention.

As an example, the intervention may be a uniformly colored display screen, a display screen including text information, an animated display screen, optionally a screen, wherein the user needs to perform an interaction with the displayed information. The intervention may be displayed in the foreground of the display in total or may be displayed as a banner. In particular displaying the intervention as a banner may be conducted in case the intervention method is provided by the operating system.

As used herein, the expression "playing back an audio file from the computing device or a device connected to the computing device" may relate to playing back an audio file from the computing device or a device connected to the computing device so that the user can perceive the intervention by hearing. In this case, the requested target media service may generally not be displayed on the computing device or at least only until the audio file is played back.

As used herein, the expression "physically interacting the user and the computing device or a device connected and in communication with the computing device" may relate to physically interacting the user and the computing device or a device connected and in communication with the computing device so that the user can physically perceive the intervention.

According to a further alternative embodiment of the first or second aspect of the invention, the method may comprise a step, wherein the user selects in the intervention step e) as an action dismissal of intervention so that the intervention is aborted and this selected action triggers storage of a time stamp of dismissal of intervention for the requested target media service in a database. Such a storing of time stamp is useful in case a statistical overview of the intervention method shall be provided to the user. Such a statistical overview may further visualize the user's media service usage patterns and may function as a further control in order to reduce the screen time.

According to a further alternative embodiment of the first or second aspect of the invention, the method may comprise a step, wherein the intervention is completed in step e) according to the intervention parameters and the user selects in a further method step f) as an action access to the requested target media service so that the target media service is launched on the computing device and this selected action triggers storage of a time stamp for completing intervention of the target media service in a database. Such a storing of time stamp is useful in case a statistical overview of the intervention method shall be provided to the user. Such a statistical overview may further visualize the user's media service usage patterns and may function as a further control in order to reduce the screen time.

According to a further alternative embodiment of the first or second aspect of the invention, the method may comprise a step, wherein the intervention is completed in step e) according to the intervention parameters and the user selects in a further method step f) as an action access to the requested target media service so that the target media service is launched on the computing device and this selected action triggers storage of a time stamp for completing intervention of the target media service in a database, and wherein the selected access to the requested target media service further triggers based on the intervention parameter determining that a re-execution of the intervention for the target media service is scheduled within a predetermined time and storing this data in a database. Such a re-execution of the intervention after a predetermined time may increase the conscious interaction of the user with the target media service and, thus, may reduce the overall time spent with the target media service.

According to a further alternative embodiment of the first or second aspect of the invention, the method may comprise a step, wherein the user further selects in step e) as an action identification of an intention to use the requested target media service and this selected action triggers storage of identification data for intention to use of the requested target media service in a database and after completing the step e) the user selects in a further method step f) as an action access to the requested target media service so that the target media service is launched on the computing device and this selected action triggers storage of a time stamp for completing intervention of the target media service in a database, and wherein the user further selects in step e) as an action identification of an intention to use the requested target media service and this selected action triggers storage of identification data for intention to use of the requested target media service in a database. Such an embodiment is useful to increase the conscious interaction of the user with the target media service. Furthermore, such a storing of time stamp is useful in case a statistical overview of the intervention method shall be provided to the user. Such a statistical overview may further visualize the user's media service usage patterns and may function as a further control in order to reduce the screen time.

According to a further alternative embodiment of the first or second aspect of the invention, the intention to use selected in step e) may further trigger based on the intervention parameter determining that i) a re-execution of the intervention for the target media service is to be scheduled within a predetermined time and storing this data in a database, ii) a notification to the user about the intention for using the target media service is to be scheduled within a predetermined time and storing this data in a database, and/or iii) a notification to the user about re-evaluation of further using the target media service is to be scheduled within a predetermined time and storing this data in a database. This embodiment may further increase conscious interaction of the user with the target media service and may, thus, reduce the overall time spent with the target media service. Furthermore, such a storing of time stamp is useful in case a statistical overview of the intervention method shall be provided to the user. Such a statistical overview may further visualize the user's media service usage patterns and may function as a further control in order to reduce the screen time.

According to a further alternative embodiment of the first or second aspect of the invention, the method may comprise a step, wherein the user selects in step e) dismissal of the access to the requested target media service and launch of a selected predetermined healthy media service on the computing device and this selected action triggers storage a time stamp of access request to healthy media service in a database. Such a storing of time stamp is useful in case a statistical overview of the intervention method shall be provided to the user. Such a statistical overview may further visualize the user's media service usage patterns and may function as a further control in order to reduce the screen time and/or to increase the healthy media service interaction.

As used herein, the expression "predetermined healthy media service" may relate to a one or more healthy media services to be selectable by a user when conducting the intervention in step e). The provided healthy media service may be selected from a predetermined list of media services relating to sports performed by the user, hobbies performed by the user, actions of wellbeing performed by the user.

According to a further alternative embodiment of the first or second aspect of the invention, the method may comprise a step, wherein the user selects in step e) dismissal of the access to the requested target media service and to directly pick an activity from a list or to launch a list including recommendations on predetermined healthy activities to be performed by the user instead of accessing the target media service. Such healthy activity may relate to a predetermined listing of one a sporting activity for a user, a hobby activity for a user, a wellbeing activity for a user, a photographic file of a user or a collection thereof, a video file of a user or a collection thereof, a personal contact of a user to be contacted, such as a contact, who is identified as close contact, but has not been contacted within a predetermined time, a list of calendar events, a list of reminder to-does, etc. In case the user selects a healthy activity, this selected action triggers storage a time stamp of healthy activity in a database. Such a storing of time stamp is useful in case a statistical overview of the intervention method shall be provided to the user. Such a statistical overview may further visualize the user's media service usage patterns and may function as a further control in order to reduce the screen time and/or to increase the healthy media service interaction. Such an embodiment is further useful in case the operating system provides the intervention method, as the operating system may directly have access to data relating to the predetermined activities, e.g., as the operating system can detect when a healthy contact has been contacted the last time.

According to a further alternative embodiment of the first or second aspect of the invention, the method may comprise a step, wherein determining in step d) to not intervene access to the target media service triggers determining that i) an execution of the intervention for the target media service is to be scheduled within a predetermined time and storing this data in a database, ii) a notification to the user about the intention for using the target media service is to be scheduled within a predetermined time and storing this data in a database, and/or iii) a notification to the user about re-evaluation of further using the target media service is to be scheduled within a predetermined time and storing this data in a database. Such a storing of time stamp is useful in case a statistical overview of the intervention method shall be provided to the user. Such a statistical overview may further visualize the user's media service usage patterns and may function as a further control in order to reduce the screen time and/or to increase the healthy media service interaction.

According to a further alternative embodiment of the first or second aspect of the invention, the method may comprise a step, wherein the computing device is connected to and in communication with a web server, which includes a processor and a database, wherein the web server is configured to store at least part of the predetermined context data of the target media service and/or predetermined health data of the user and wherein the context data and/or health data stored on the web server is used in step d) for determining that the intervention step e) is to be carried out or not.

According to a further alternative embodiment of the first or second aspect of the invention, the method may comprise a step, wherein the user interacts with the computing device in order to close the target media service which triggers storing the time stamp of closing the target media service and optionally dismissing a scheduled further intervention and/or notification for intention and/or re-evaluation of use of target media service, wherein the time stamp of closing the target media service is not stored in case the time interval between the time stamp of present closing of target media service and the time stamp of last access of the target media service is up to 5 seconds. Such an embodiment is specifically useful, as in this embodiment the intervention triggers a user to not access the target media service and accordingly screen time of the requested target media service.

According to a further alternative embodiment of the first or second aspect of the invention, the method may comprise a step, wherein the target media service is selected from a media service provided by the operating system of the computing device, an application service installed on the computing device, an application service accessible by the computing device using a connected web server, and a website accessible by the computing device using a connected web server, or respectively part thereof.

As used herein, the expression "media service provided by the operating system of the computing device" may relate to a predetermined media service provided by the operating system and identified as a target media service, such as a messaging service, a music service, a media playback service, a gaming service, a document viewer service etc.

As used herein, the expression "application service installed on the computing device" may relate to a predetermined application service provided or accessible by the computing device and identified as a target media service, such as a social media service, e.g. TikTok, Instagram, Twitter, LinkedIn, Snapchat, Facebook, a news media service, e.g. New York Times, Washington Post, SPIEGEL Online, a dating media service, e.g. Tinder, Grinder, Bumble, a financial media service, e.g. Coinbase, banking apps, a gaming media service, e.g. Candy Crush, PUBG, Fortnite, Pokémon GO, Clash Royal, a messaging service, e.g. email apps, iMessage, WhatsApp, Telegram, a video streaming media service, e.g. Netflix, Disney, Amazon Prime Video, Sky, an online shopping media service, e.g. Amazon, Ebay, a gambling media service, e.g. bet365, Tipico, bwin, etc.

As used herein, the expression "application service accessible by the computing device using a connected web server" may relate to a predetermined application service accessible by the computing device using a connected web server and identified as a target media service, such as a web application/cloud application of an email account, a web application/cloud application of a social media service, such as of TikTok, Instagram, Twitter, LinkedIn, Snapchat, Facebook, of a news media service, e.g. New York Times, Washington Post, SPIEGEL Online, of a dating media service, e.g. Tinder, Grinder, Bumble, of a financial media service, e.g. Coinbase, banking apps, of a gaming media service, e.g. Candy Crush, PUBG, Fortnite, Pokémon GO, Clash Royal, of a messaging service, e.g. iMessage, WhatsApp, Telegram, of a video streaming media service, e.g. Netflix, Disney, Amazon Prime Video, Sky, of an online shopping media service, e.g. Amazon, Ebay, of a gambling media service, e.g. bet365, Tipico, bwin, etc.

As used herein, the expression "website accessible by the computing device using a connected web server" may relate to a predetermined website accessible by the computing device using a connected web server and identified as a target media service, such as a website of an email account, a website of social media service, such as TikTok, Instagram, Twitter, LinkedIn, Snapchat, Facebook, a web site of a news journal, e.g. New York Times, Washington Post, SPIEGEL Online, a website of a dating service, e.g. Tinder, Grinder, Bumble, a website of a financial service, e.g. Coinbase, banking apps, a website of a gaming media service, e.g. Candy Crush, PUBG, Fortnite, Pokémon GO, Clash Royal, a website of a messaging service, e.g. iMessage, WhatsApp, Telegram, a website of a video streaming service, e.g. Netflix, Disney, Amazon Prime Video, Sky, a website of an online shopping service, e.g. Amazon, Ebay, a website of a gambling service, e.g. bet365, Tipico, bwin etc.

In case the target media service is provided as an application service and/or a website respectively accessible by the computing device using a connected web server, the target media service (synonymous: web target media service) may be accessed by the connected computing device via suitable network connection device, such as an application displaying content provided or streamed by a web server, a web viewing device, or a web browser. The web server, however, does not provide data informing about closing of the web target media service by a user. To overcome this shortage, the present invention solves the problem differently. The intervention method of the present invention provides a computing device, which may be configured to detect use of the web target media service by the user and may, thus, generate and store one or more respective time stamps for the duration of detected use (synonymous: "in-use time stamps"). In case the user stops using the web target media service, the computing device may not detect any continued use of the web target media service and may, thus, not generate a further time stamp. In order to determine the time stamp of closing the web target media service, the intervention method of the present invention may, thus, determine the last in-use time stamp of a sequence stored for a web target media service to represent the time stamp of closing the web target media service. The last in-use time stamp of a sequence may also be determined as the last in-use time stamp of a sequence being also the last in-use time stamp prior to a predetermined time-out interval.

According to a further alternative embodiment of the first or second aspect of the invention, the method may comprise a step, wherein the computing device is selected from a smart device including a smart phone, a smart tablet, a smart tv, a smart wearable, such as a smart watch, smart glasses, and smart brain-computer interfaces, a desktop computing device and a laptop computing device. The respective computing device includes the suitable means and power supply in order to conduct the programmable instructions.

According to a further alternative embodiment of the second aspect of the invention, the method may comprise a step, wherein the operating system comprises instructions to access a media service or part thereof upon request of a user and wherein the operating system is configured to synchronously control intervention of target media services on different inter-connectable computing devices having the same operating system or wherein the operating systems of the different inter-connectable computing devices can connect and communicate with each other. In other words, this embodiment prevents a user to find circumvention to the intervention method by selecting a different end device. As an example, the intervention method and the respective parameter are provided by the operating system of the smart phone, e.g. iPhone. In case the user also has connected a different device of the same or connectable operating system with the iPhone, such as an iPad, or Apple Watch, the user cannot switch to the iPad or Apple Watch in order to access the target media service, as the operating system of all computing devices interact with each other. Furthermore, potential rewards, such as healthy activity etc., performed by a user on one device will also be recognized by another connected computing device. Such an embodiment may further nudge a user to control the screen time of identified target media services and, thus, reduce their screen time.

According to a further alternative embodiment of the second aspect of the invention, the method may comprise a step, wherein the operating system of the computing device is configured to abort connections to one or more further devices including web servers in order to prevent loading of new content of a requested target media service after a predetermined time. Such an embodiment is useful in order to not provide any further rewards received by the requested target media service to the user.

According to a third aspect of the present invention a computing device including processor and memory is provided, wherein the computing device comprises computer-executable program instructions embodied on the computing device that, when executed by the computing device, performs a method to intervene access to a target media service requested by a user according to the first or second aspect of the present invention.

Particular Embodiments

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a smart phone, a smart tablet, a smart tv, a smart wearable, such as a smart watch, smart glasses, and smart brain-computer interfaces, a desktop computing device and a laptop computing device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes one or more computer storage databases 110, 120 and processors (not shown in FIG. 1). Computing device 100 comprises computer-executable instructions embodied thereon including computer-executable instructions to carry out a method to intervene access to a target media service requested by a user. The computing device 100 generally includes suitable means so that the computing device 100 may perform the inventive method.

The inventive method generally disclosed in FIG. 1 may include the following method steps:

According to a first step 1100, a media service 101 may be determined to be identified as a target media service 102 in case access to the media service 101 shall be intervened using the computing device 100 (represents method step b) of the detailed description). In this regard, a unique target media service identifier data may be stored in a Target Media Service Identifier Database 110. Activity status data of the target media service 102 including time stamp of access request to the target media service and time stamp of closing the target media service may be stored in a Media Service Usage Database 120. A time stamp of completing intervention for the target media service 102 may also be stored in a database 120. In general, the respective activity status data may be stored in a Media Service Usage Database 120 in such a way that the respective time stamps may be allocated with respective target media service information, e.g. stored together with unique target media service identifier data and optionally a respective label, such as "access request for target media service", "closing of target media service", "completion of intervention for target media service".

With continued reference to FIG. 1, in a further monitor method step 1200 a user interaction with the computing device 100 may be detected by the computing device 100 that triggers a request to access a media service 101 (represents method step b) of the detailed description). In case the computing device 100 may detect such an interaction, the computing device 100 may determine that the requested access may be a request to access one of the target media services 102 (present access request) based on the unique target media service identifier data stored in the Target Media Service Identifier Database 110. In other words, the computing device 100 may compare the identifier of respectively requested media service 101 with the list of unique target media service identifiers stored in the Target Media Service Identifier Database 110 and in case media service identifiers match, the requested media service may be determined as a target media service 102, to which an access may be intervened.

With continued reference to FIG. 1, the target media service 102 may be selected from a media service provided by the operating system of the computing device, an application service installed on the computing device, an application service accessible by the computing device using a connected web server, and a website accessible by the computing device using a connected web server, or respectively part thereof.

In addition, the monitor method step 1200 in FIG. 1 may additionally include detecting a request to close a media service 101 as a result of an interaction of the user with the computing device 100. This monitoring step 1200 may be conducted by the same or different monitoring means of the computing device 100. In case the computing device 100 may detect such an interaction, the computing device 100 may determine that the requested closing is a request to close one of the target media services 102 (present closing request) based on the unique target media service identifier data stored in the Target Media Service Identifier Database 110. In other words, the computing device 100 compares the identifier of respectively requested media service 101 with the list of unique target media service identifiers stored in the Target Media Service Identifier Database 110 and in case identifiers match, the requested media service 101 is determined as a target media service 102, which access may be intervened.

FIG. 1 may further include an evaluation method step 1300, wherein the computing device 100 may determine that the present access request to the target media service 102 of step 1200 may be intervened based on the activity status data for the requested target media service 102 (represents method step d) of the detailed description). The evaluation method step 1300 may be performed as an extension program so that it can be performed independent from the intervention step 1400. Such an embodiment may reduce time and energy consumption. The activity status data of the target media service 102 may be stored in the Media Service Usage Database 120 as set out above.

According to an aspect of the present invention disclosed in FIG. 1, the present access request to the target media service 102 may not be intervened when determining in the evaluation step 1300 that a time interval between the time stamp of the present access request for the target media service 102 and a time stamp of completion of last intervention for the target media service 102 is up to 10 seconds. In addition, the present access request to the target media service 102 may not be intervened when determining in the evaluation step 1300 that a time interval between the time stamp of the present access request for the target media service 102 and a time stamp of last closing the target media service 102 is up to 5 minutes. According to an aspect of the present invention, the time stamp of the present access request for the target media service 102 may only be stored in a Media Service Usage Database 120 in case the access to the target media service 102 is determined to be intervened in a further intervention step 1400. Thus, in case the target media service 102 is not to be intervened in a further intervention step 1400, the time of the present access request for the target media service 102 may not be stored. This facilitates that first of all, the user can launch the target media service 102 after completion of the evaluation method 1300 without conducting a further monitoring method step, as the launch of the target media service 102 may be detected as a new request to access the target media service. Moreover, the invention allows a user to (intentionally) switch from using the target media service 102 and to check other information on another service, such as checking with the calendar in order to find a slot for a meeting or checking with a map in order to find a location, and returning back to the target media service within the predetermined time of up to 5 minutes, up to 3 minutes, or up to 1 minute, in order to finalize the usage of the target media service 102.

In case the determination result of the evaluation method step 1300 in FIG. 1 is that the present access request to the target media service 102 is not to be intervened, the intervention method 1400 may not conducted and instead the computing device 100 may launch the target media service 102. In other words, users may not even recognize that an evaluation step 1300 has been conducted after their interaction with the computing device 100.

In case the determination result of the evaluation step 1300 of FIG. 1 is that the present access request to the target media service 102 is to be intervened, the intervention method step 1400 may generally be conducted (represents method step e) of the detailed description). According to method step 1400 access to the requested target media service 102 may be intervened, wherein the intervention may be perceivable by the user and may be selected from predetermined intervention parameter stored for the requested target media service on or accessible by the computing device 100. The intervention parameter may be derivable from data stored in the Media Service Usage Database 120 and/or may be derivable from a general "setting" database (not shown in FIG. 1) of the computing device.

In addition and not shown in FIG. 1, is an embodiment of the present invention wherein the evaluation method step 1300 may additionally be based on predetermined context data, wherein the context data may include i) predetermined location data of the computing device 100, ii) predetermined data of time of the day at the location of the computing device 100, iii) predetermined health data of the user, iv)

predetermined data on performed actions of the user within a predefined time interval prior to the access request present of detected in monitor method step 1200, v) predetermined focus mode. Details to the context data are set out in the detailed description of the invention hereinbefore and can be combined with the particular embodiments.

Further not shown in FIG. 1 is an embodiment of the present invention wherein after completing the intervention method step 1400, the computing device may either launch the target media service 102. In this case, the selected action may trigger storage of a time stamp for completing intervention of the target media service in the Media Service Usage Database 120. Alternatively, after completion of the intervention method step 1400, the user may in another embodiment select to not access the target media service. In this case, the time stamp of closing the target media service 102 may not be stored in the Media Service Usage Database 120. Further in this case, the user may optionally select to not perform any other service instead. Moreover, the user may optionally select to request access to another media service 101, such as a healthy media service. In this case, the selected action may trigger storage of a time stamp of access request to the selected (healthy) media service in the Media Service Usage Database 120. Further not shown in FIG. 1 is an alternative embodiment according to which the user may not complete the intervention method step 1400, but may dismiss the intervention method step 1400. In this case the selected action may trigger storage of a time stamp of dismissal of intervention for the requested target media service in the Media Service Usage Database 120. The intervention method 1400 may be hidden and the target media service 102 may not be accessed.

In general, the predetermined intervention parameter of the intervention method step 1400 may comprise data on the duration of an intervention method step 1400 in order to complete the intervention, data on a type of interaction for the user to be carried out in order to complete the intervention method step 1400, data on a number of interaction types to be carried out by a user to complete the intervention method step 1400, data whether a re-execution of intervention method step 1400 shall be scheduled when launching the target media service 102 after completing the intervention method step 1400, and data on whether to block access to the requested target media service 102. Details to the intervention parameter are set out in the detailed description of the invention hereinbefore and can be combined with the particular embodiments.

Also not shown in FIG. 1 is an embodiment of the present invention wherein the computing device 100 may further be connected and in communication with a second computing device 1001 controlled by a second user. In this case the computing device 100 communicates the present access request data to the second computing device 1001 so that the second user can select as action confirmation that the requested target media service 102 can be accessed by the user of the computing device 100 after completing intervention 1400.

The intervention method 1400 is perceivable by the user and may be selected from i) displaying an intervention 1400 on the computing device 100 or a device connected to the computing device 100, ii) playing back an audio file from the computing device 100 or a device connected to the computing device 100, and iii) physically interacting the user and the computing device 100 or a device connected and in communication with the computing device 100. Details to the intervention perception are set out in the detailed description of the invention hereinbefore and can be combined with the particular embodiments.

Further not shown in FIG. 1 is an embodiment of the present invention wherein the intervention method 1400 may be completed according to the intervention parameters 14021 (not shown in FIG. 1) and the user selects in a further step 140211 as an action access to the requested target media service 102 so that the target media service 102 is launched on the computing device 100 and this selected action triggers storage of a time stamp for completing intervention of the target media service 14022 in a database, such as the Media Service Usage Database 120. According to another aspect of the present invention and also not shown in FIG. 1 is that after completing the intervention method 1400, the user may further select as part of the intervention as an action identification of an intention to use the requested target media service 102 and this selected action triggers storage of identification data for intention to use of the requested target media service in a database, such as the Media Service Usage Database 120.

Further not shown in FIG. 1 is an embodiment of the present invention wherein in case the result of the evaluation method 1300 is to not intervene access to the target media service, this result may trigger determining that i) an execution of the intervention for the target media service 102 is to be scheduled within a predetermined time and storing this data in a database, ii) a notification to the user about the intention for using the target media service 102 is to be scheduled within a predetermined time and storing this data in a database, and/or iii) a notification to the user about re-evaluation of further using the target media service 102 is to be scheduled within a predetermined time and storing this data in a database, wherein the storage database may respectively be the Media Service Usage Database 120.

Further not shown in FIG. 1 is an embodiment of the present invention wherein the user may interact with the computing device 100 in order to close the target media service 102 which triggers storing the time stamp of closing the target media service 102 and optionally dismissing a scheduled further intervention and/or notification for intention and/or re-evaluation of use of target media service, wherein the time stamp of closing the target media service 102 is not stored in case the time interval between the time stamp of present closing of target media service and the time stamp of last access of the target media service is up to 5 seconds.

Figure 2A:
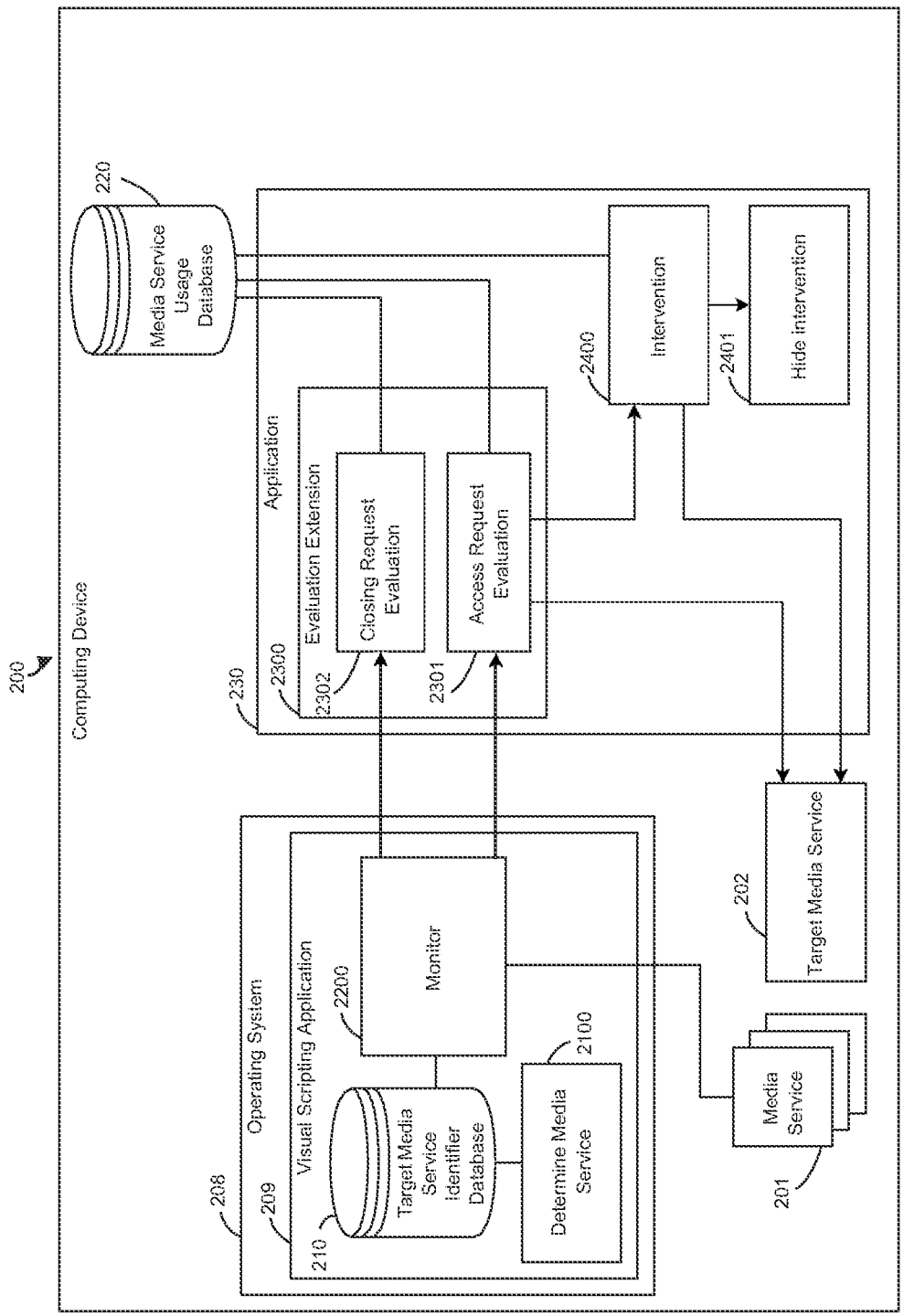
FIG. 2A is a simplified diagram of an exemplary computing environment suitable for implementing embodiments of the invention, wherein the intervention method is installed on the computing device as a third application service.

Turning now to FIGS. 2A) to 2C), simplified diagrams of exemplary computing environments suitable for implementing embodiments of the invention are shown, wherein the intervention method is installed at least in part on the computing device 200 as an application 230.

In this respect FIG. 2A) shows a computing device 200, wherein an operating system 208 of the computing device may include a visual scripting application 209. The Visual Scripting Application 209, also known for iOS operating systems Shortcuts App, may comprise a Target Media Service Identifier Database 210, which includes the predetermined reference data of unique target media service identifiers in order to compare identifiers of a media service 201 to be determined in step 2100 in view of representing a target media service 202. In the monitor method step 2200 it is detected whether a request to a media service 201 is a request to access a target media service based on the unique target media service identifiers stored in the Target Media Service Identifier Database 210. Further information is already disclosed with respect to FIG. 1 and are also applicable with FIGS. 2A) to 2C).

According to FIGS. 2A) to 2C), the subsequent inventive method steps are based on instructions provided by an application 230 installed on the computing device 200, wherein a separate part of this application may be an Evaluation Extension method 2300. Such a separate operable Evaluation Extension 2300 is useful, as it may be quicker than comparable executable instruction included within the application 230 itself and furthermore, the operation may be less energy consuming, which may lead to an increase in time until next charging.

The Evaluation Extension method step 2300 may detect that an interaction of a user with a computing device triggers a request to access a media service 102 and determining that the requested access is a request to access one of the target media services based on the stored unique target media service identifier 2301 (present access request). The time stamp of the present access request may generally be stored in the Media Service Usage Database 220. Alternatively, the Evaluation Extension method step 2300 may detect that an interaction of a user with a computing device triggers a request to close one of the target media services 102 based on the unique target media service identifier data stored in the Target Media Service Identifier Database 110. The time stamp of the closing request may generally be stored in the Media Service Usage Database 220.

FIG. 2A) to 2D) further show that in the subsequent intervention method step 2400 it is determined whether the present access request to the target media service detected in the Extension Evaluation 2300 is to be intervened based on the activity status data for the requested target media service 202. The present access request to the target media service 202 is not to be intervened i) when determining that a time interval between the time stamp of the present access request for the target media service 202 and a time stamp of completion of last intervention for the target media service 202 is up to 10 seconds, and ii) when determining that a time interval between the time stamp of the present access request for the target media service 202 and a time stamp of last closing the target media service is up to 5 minutes. The time stamp of the present access request for the target media service 202 may only be stored in a database, such as the Media Service Usage Database in case the access to the target media service is determined to be intervened. In an intervention method step 2400 access to the requested target media service 102 may be intervened, wherein the intervention 1400 is perceivable by the user and is selected from predetermined intervention parameter stored for the requested target media service 202 on or accessible by the computing device 200.

FIG. 2A) further shows the step of hiding intervention 2401, which may be the result of dismissal of the intervention. Alternatively, the target media service 202 may be launched by the user after completing the intervention method 2400.

Figure 2B:
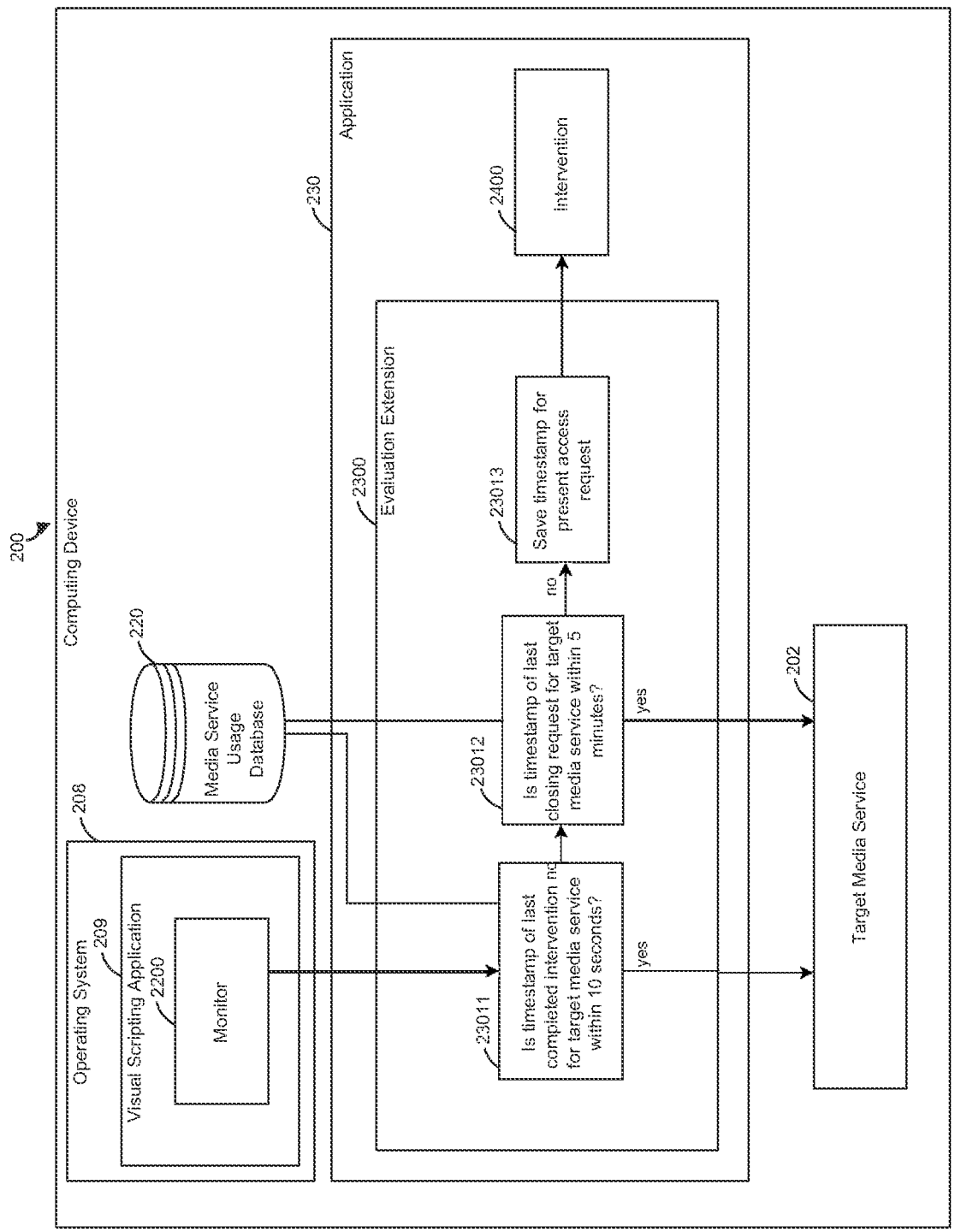
FIG. 2B is a simplified diagram of an extract of an exemplary computing environment suitable for implementing embodiments of the invention relating to access request evaluation, wherein the intervention method is installed on the computing device as a third party application service.

FIG. 2B) shows an extract of the intervention method according to the present invention, wherein the intervention method is at least in part installed as an application 230 on the computing device 200. In case the monitor step 2200 detects an access request to a target media service, the Evaluation Extension method step 2300 includes the determination whether the time stamp of last completed intervention for the requested target media service is within 10 seconds, within 5 seconds, within 3 seconds, or within 1 second. If yes, the target media service 202 may be accessed without performing an intervention method step 2400. In this case the time stamp of the present access request is not stored in the Media Service Usage Database 220. Such an embodiment facilitates to launch the target media service 202 after having shortly before completed the intervention.

In case the time stamp of last completed intervention for the target media service 202 is outside the time interval of up to 10 seconds, the Evaluation Extension method 2300 may further determine whether the time stamp of last closing request for target media service 202 is within 5 minutes, within 3 minutes, or within 1 minute. If yes, the target media service 202 may be accessed without performing the intervention method step 2400, which facilitates conscious switching from the target media service 202 to another media service 201, such as the calendar or map service in order to check some information and to return back to the target media service 202 for completing the service. In case the time stamp of last closing request for target media service 202 is outside the interval of up to 5 minutes, the time stamp for present access request may be saved, such as in the Media Service Usage Database 220 and the intervention method step 2400 is to be carried out. Further details are described hereinbefore with respect to FIGS. 1 and 2A.

Figure 2C:
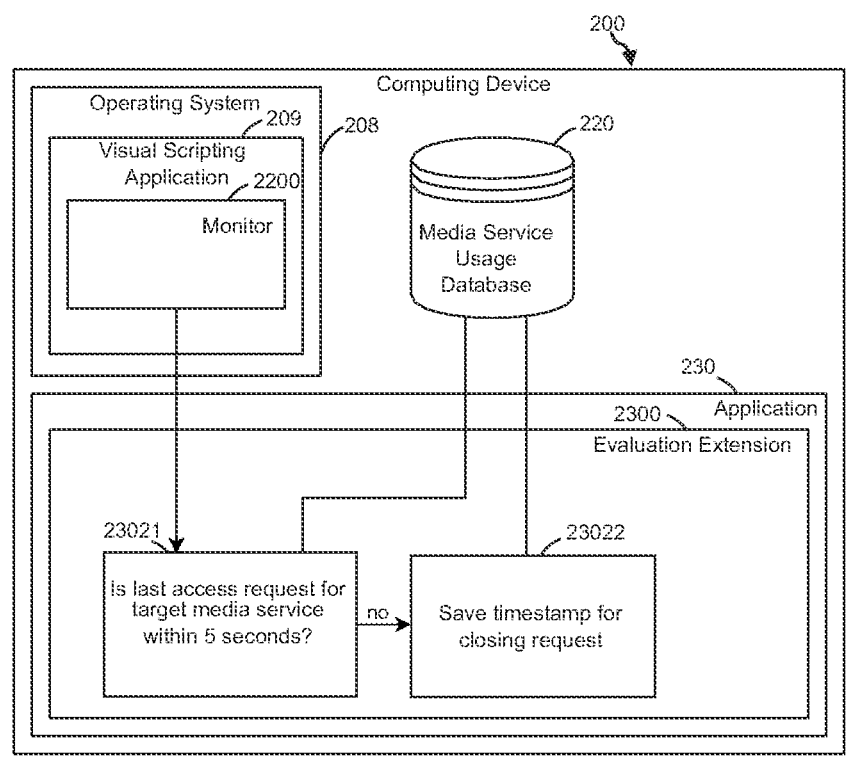
FIG. 2C is a simplified diagram of an extract of an exemplary computing environment suitable for implementing embodiments of the invention relating to closing request evaluation, wherein the intervention method is installed on the computing device as a third party application service.

In FIG. 2C) an embodiment is shown, wherein the monitor method step 2200 determines that a closing request to a target media service 202 has been initiated. The Evaluation Extension 2300 further determines whether the last access request or the target media service 23021 is within 5 seconds, 3 seconds, or 1 second. If yes, the closing request time stamp is not stored in a database. In case the last access request for the target media service 202 is not within 5 seconds it means that the closing request may not be triggered by conducting an intervention method. In this case, the time stamp for closing request is stored 23022 in a database, such as the Media Service Usage Database 220. In view of closing the target media service 202, no intervention method 2300 is performed and optionally all scheduled re-evaluations, notifications on re-evaluation or notification on intention to use may be dismissed.

Figure 2D:
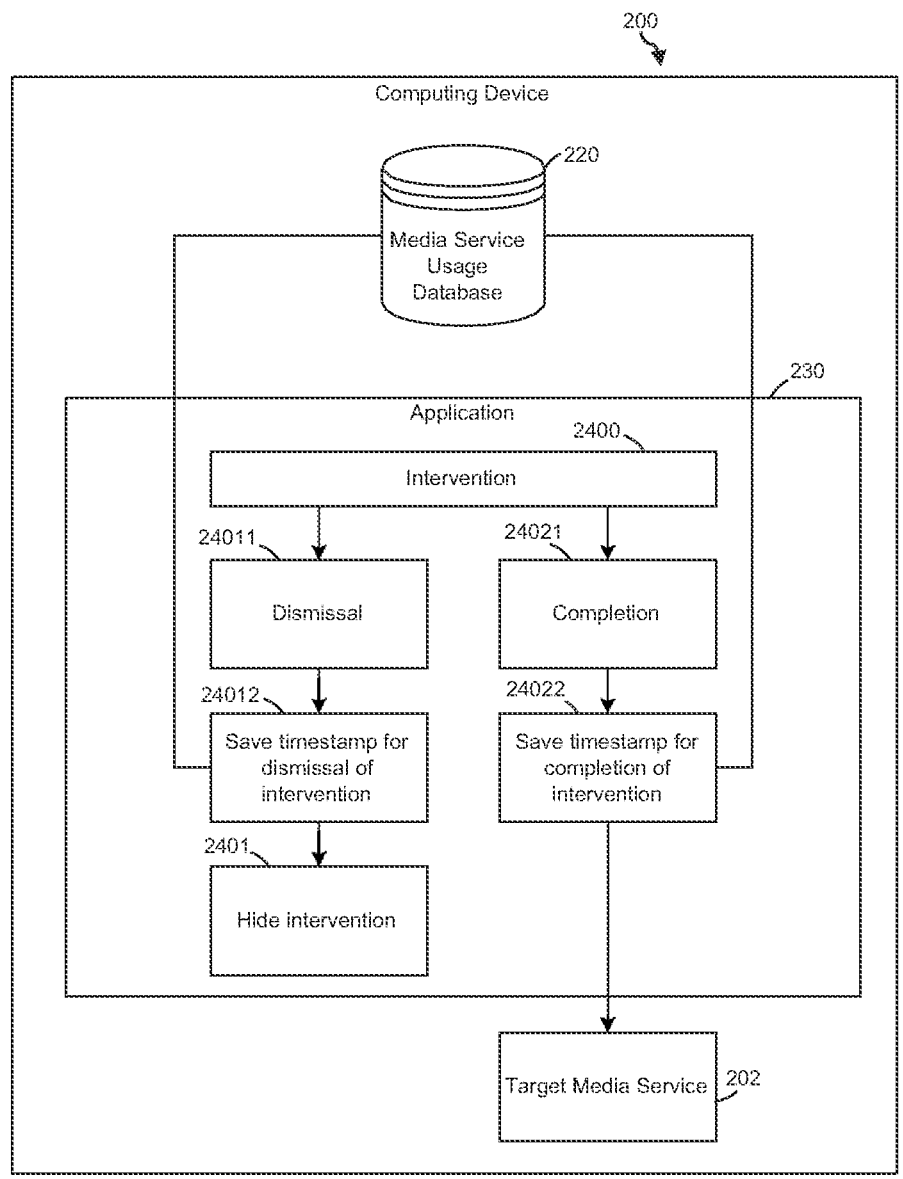
FIG. 2D is a simplified diagram of an extract of an exemplary computing environment suitable for implementing embodiments of the invention relating to intervening access of a target media service, wherein the intervention method is installed on the computing device as a third party application service.

FIG. 2D) shows a simplified diagram of an extract of an exemplary computing environment suitable for implementing embodiments of the invention relating to intervening access 2400 of a target media service 202, wherein the intervention method is installed on the computing device as a third party application 230. In case the intervention method step 2400 may be dismissed by the user 24011, a time stamp for dismissal of intervention may be stored in a database, such as the Media Service Usage Database 220 and furthermore the intervention method may be hidden 2401. The target media service 202 may be accessed by the user. Alternatively, the user may complete the intervention method 24021. In this case a time stamp for completion of intervention 2400 may be stored in the Media Service Usage Database 220. In addition, the user may launch the target media service 202. Alternatively, the user may decide to not launch the target media service 202 and to do nothing instead, or to launch another (healthy) media service and/or to select an intention to use the target media service 202, which actions are all not shown in FIG. 2D).

Figure 3A:
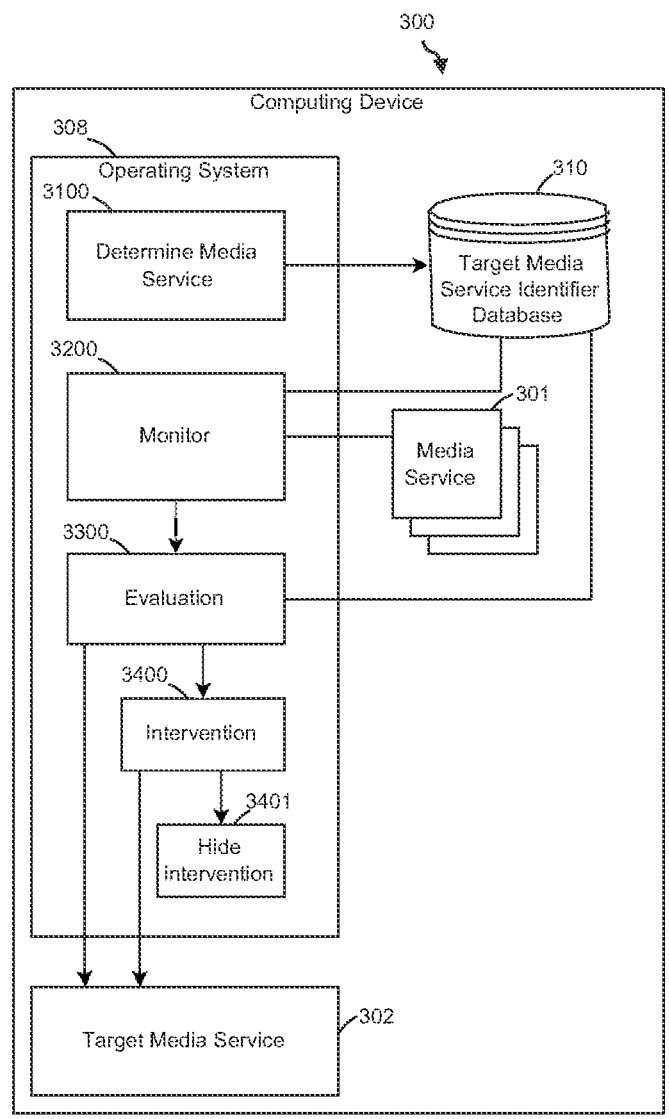
FIG. 3A is simplified diagram of an exemplary computing environment suitable for implementing embodiments of the invention, wherein the intervention method is provided by the operating system of the computing environment.

According to the second aspect of the present invention, the FIGS. 3A) to 3F) shown an embodiment wherein the intervention method of the present invention is at least in part provided by the operating system 308 of a computing device 300 (may represent embodiments of the second aspect of the present invention as disclosed in the detailed description).

Accordingly, the method step of determining the media service 3100 is according to FIG. 3A) also provided by the operating system 308. In this regard, the operating system may determine a media service 301 to represent a target media service 302 in method step 3100 and may access Target Media Service Identifier Database 310 in order to store unique target media service identifier data. This database may be part of the operating system 308 (not shown in FIG. 3A) or may be part of other parts of the computing device 300. In addition or alternatively (not shown in FIG. 3A)), the user may determine a media service 301 to represent a target media service 302.

The monitor step 3200 is according to FIG. 3A) also provided by the operating system 308 and detects a user interaction which may triggers a request of the computing device 300 to access a media service 301 and determining that the requested access is a request to access one of the target media services 302 based on the stored unique target media service identifier data in the Target Media Service Identifier Database 310 (present access request).

The evaluation step 3300 is according to FIG. 3A) also provided by the operating system and facilitates determining that the present access request to the target media service is to be intervened based on the activity status data. In other words, the present access request to the target media service is to be intervened when determining that an access request was triggered by a user.

Furthermore, the intervention method step 3400 is according to FIG. 3A) also provided by the operating system 308 and facilitates intervening access to the requested target media service 302, wherein the intervention 3400 is perceivable by the user and is selected from predetermined intervention parameter stored for the requested target media service 302 on or accessible by the computing device 300. In case the intervention method 3400 may be dismissed by the user, the intervention may be hidden 3401 and the target media service 302 may not be accessed.

Figure 3C:
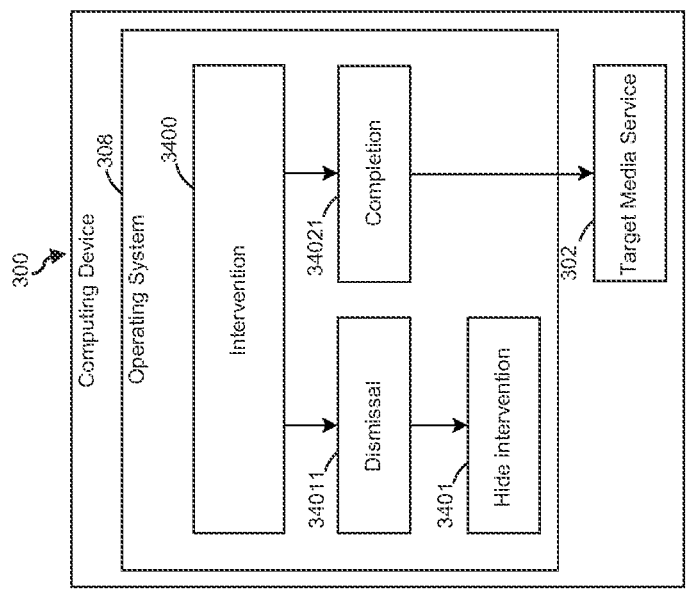
FIG. 3C is a simplified diagram of an extract of an exemplary computing environment suitable for implementing embodiments of the invention relating to intervention method step, wherein the intervention method is provided by the operating system of the computing environment.
Figure 3B:
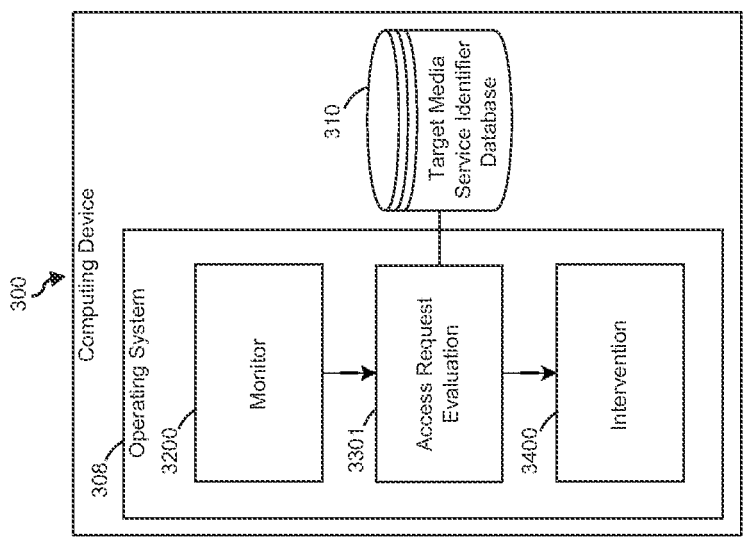
FIG. 3B is a simplified diagram of an extract of an exemplary computing environment suitable for implementing embodiments of the invention relating to access request evaluation, wherein the intervention method is provided by the operating system of the computing environment.

In FIG. 3B) a simplified diagram of an extract of an exemplary computing environment suitable for implementing embodiments of the invention relating to access request evaluation 3301 is shown, wherein the intervention method is provided at least in part by the operating system of the computing environment. In other words, in FIG. 3B) it is determined that a user interaction with the computing device 300 triggers an access request to a target media service 3301 based on the unique target media service identifier data stored in the Target Media Service Identifier Database 310.

In FIG. 3C) a simplified diagram of an extract of an exemplary computing environment suitable for implementing embodiments of the invention relating to intervention method step 3400, which is provided at least in part by the operating system 308. The intervention method step 3400 is provided by the operating system 308 so far an access request to a target media service 3301 has been determined in the evaluation step 3300. A user may, thus, dismiss the intervention method 34011. The intervention 3400 may then be hidden. A user may then be free to do nothing or to select another (healthy) media service (all not shown in FIG. 3C)). In case the intervention method 3400 may be completed 34021 by the user, the user may then be free to either launch the target media service 302 (see FIG. 3C)) or to do nothing or to select another (healthy) media service (both not shown in FIG. 3C)).

Figure 3D:
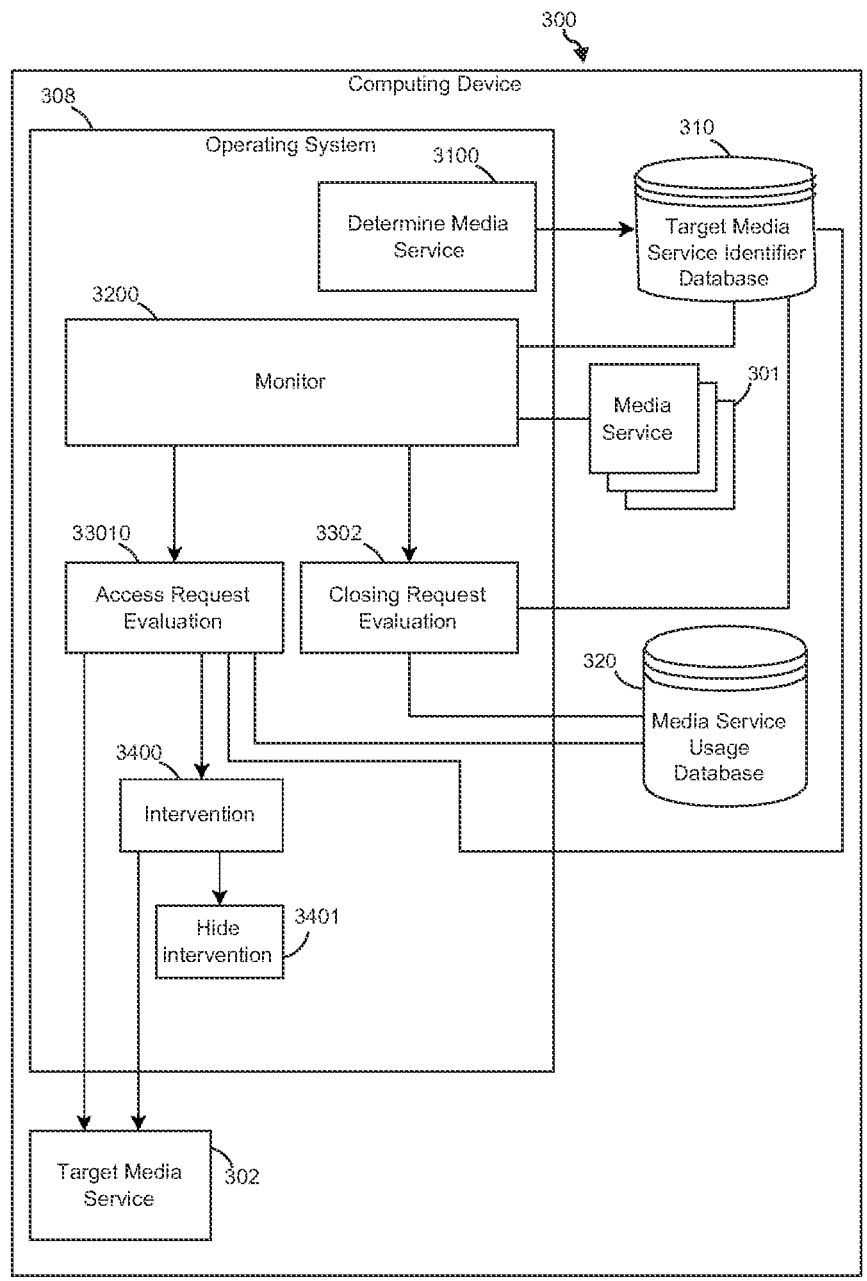
FIG. 3D is simplified diagram of computing environment suitable for implementing embodiments of the invention, wherein the intervention method is provided by the operating system of the computing environment and wherein an access request evaluation and a closing request evaluation may be conducted.

In FIG. 3D) the evaluation step 3300 is illustrated in more detail. According to one alternative, the monitor step 3200 determines that a user interaction with the computing device 300 triggers an access request to a target media service 302. In this respect, an access request evaluation 33010 is performed by the operating system, wherein a time stamp of access request may be stored. The evaluation method step of the access request 33010 may generally determine to intervene access to the requested target media service 302. The present access request to the target media service 302 is not to be intervened when determining that a time interval between the time stamp of the present access request 33010 for the target media service 302 and a time stamp of completion of last intervention for the target media service 302 is up to 10 seconds. In this case, the time stamp of the present access request for the target media service is only stored in a database, such as the Media Service Usage Database 320.

Thus, the intervention method step 3400 may be performed. In case the intervention is dismissed, the intervention may be hidden 3401. In case the intervention 3400 may be completed, the user may launch the target media service 302. According to a further alternative, the monitor method step 3300 may detect that a user interaction with the computing device 300 further triggers a request to close a media service and may determine that the requested closing is a request to close one of the target media services 302 based on the stored unique target media service identifier data stored in the Target Media Service Identifier Database 310. In the closing request evaluation 3302, the intervention method 3400 may not be performed subsequently. The evaluation method step 3400 may also not intervene a present access request to the target media service when determining that a time interval between the time stamp of the present access request for the target media service and a time stamp of last closing the target media service is up to 5 minutes, wherein the time stamp of the present access request for the target media service is only stored in a database in case the access to the target media service is determined to be intervened.

Figure 3E:
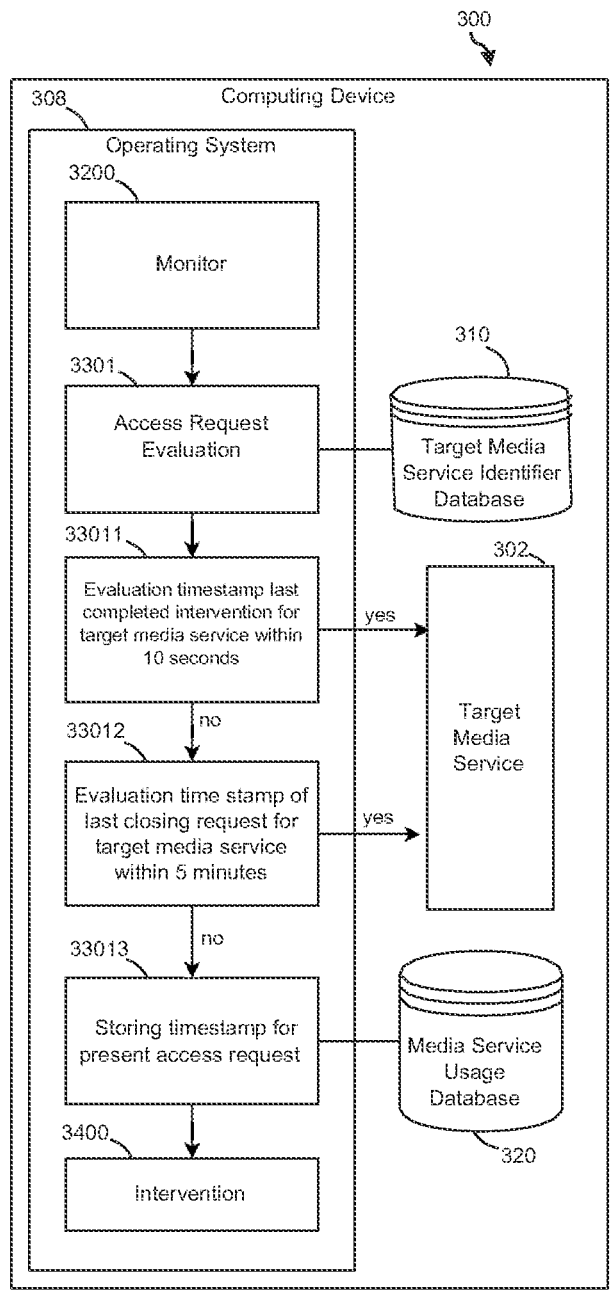
FIG. 3E is a simplified diagram of an extract of an exemplary computing environment suitable for implementing embodiments of the invention relating to access request evaluation, wherein the intervention method is provided by the operating system of the computing environment.

In FIG. 3E) a simplified diagram of an extract of an exemplary computing environment suitable for implementing embodiments of the invention relating to access request evaluation is shown in detail, wherein the intervention method is provided by the operating system of the computing environment. Accordingly, in step 3301 a requested access to a target media service using the unique target media service identifier data stored in the Target Media Service Database 310. Subsequently, it is determined in the evaluation step 33011 whether a time stamp of last completed intervention for the requested target media service access is within 10 seconds, within 5 seconds, within 3 seconds, or within 1 second. If yes, the target media service 302 may be launched by the user, as the time stamp indicates that an intervention method was just completed for the respective target media service 302. In case the time stamp of last completed intervention for the target media service 302 is outside 10 seconds, the evaluation step 33012 determines whether a time stamp of last closing request for target media service is within 5 minutes. If the result of the evaluation step 33012 results to "yes", the target media service 302 may be launched without intervention, as the time stamp indicates that the user consciously switched from the target media service 302 to another media service 301 in order to check some information on the calendar or map and to return back to the target media service 302 in order to complete the task. If the evaluation step 33012 results to "no", the time stamp for the present access request is stored in a suitable database, such as the Media Service Usage Database 320. The user may perform the intervention method 3400.

Figure 3G:
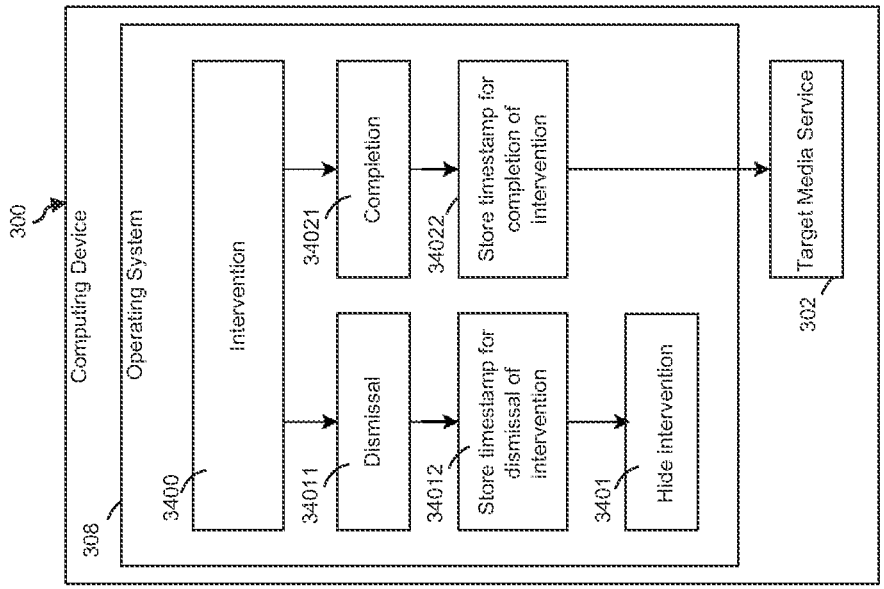
FIG. 3G is a simplified diagram of an extract of an exemplary computing environment suitable for implementing embodiments of the invention relating to intervention method, wherein the intervention method is provided by the operating system of the computing environment.
Figure 3F:
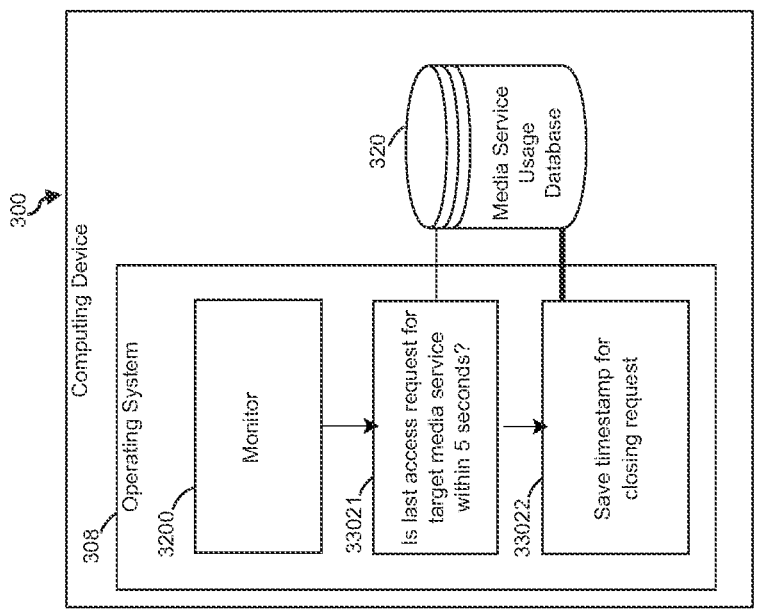
FIG. 3F is a simplified diagram of an extract of an exemplary computing environment suitable for implementing embodiments of the invention relating to closing request, wherein the intervention method is provided by the operating system of the computing environment.

In FIG. 3F) a simplified diagram of an extract of an exemplary computing environment suitable for implementing embodiments of the invention relating to closing request 33021, wherein the intervention method is provided by the operating system 308 of the computing environment 300. In case the monitor step 3200 determines that a user interaction with the computing device 300 triggers a closing request for a target media service 302, the evaluation step 3300 then determines whether the last access request for the target media service was within 5 seconds. If the evaluation step 3300 results to "no", the time stamp for closing request is stored on a suitable database 33022, such as the Media Service Usage Database 320.

In FIG. 3G) a simplified diagram of an extract of an exemplary computing environment suitable for implementing embodiments of the invention relating to intervention method 3400, wherein the intervention method 3400 is provided by the operating system 308 of the computing environment 300. In case the intervention method step 3400 is dismissed by a user 34011, a time stamp for dismissal of the intervention method 3400 is stored in a suitable database, such as the Media Service Usage Database 320. Subsequently, the intervention 3400 may be hidden 3401. Alternative (and not shown in FIG. 3G)), the user may be free to do nothing or to select another (healthy media service). Alternatively, the user may complete the intervention method step 340321 for the requested target media service 302. In this case the time stamp for completion of intervention is stored in a suitable database, such as the Media Service Usage Database 320. Subsequently, the target media service 302 may be launched.

Turning now to FIG. 4, a simplified diagram of an extract of an exemplary computing environment 400 suitable for implementing embodiments of the invention relating to providing a target media service (synonymous: "web target media service") 402 by a web server 4230 is shown. According to one aspect of the present invention, a media service 401 is provided by a web server 4230, wherein the web server is connected with a suitable network to a network connective device 4210, such as an application displaying content provided or streamed by a web server, a web viewing device, or a web browser, of a computing device 400. The network connecting device may be connected to the monitor method 4200 in such a way that the monitor method 4200 of the computing device 400 may detect use of a media service 402 by the user and may generate in-use time stamps of the requested media service 402. Based on the information of the Target Media Service Identifier Database 410, the monitor step 4200 determines whether a user interaction facilitates an access request to a target media service 402. If the result of the determination in the method step 4200 is "yes", an evaluation step 4300 may take place in order to determine whether an intervention step 4400 needs to be performed for the requested target media service. In general, a user interaction of the computing device 400 may trigger the access request to the web target media service 402. In case the intervention 4400 may be dismissed by the user, the intervention service may be hidden 4401. This aspect of the present invention may differ from the above mentioned embodiments, as the web server may not be configured to provide data on the closing of the target media service 402 from the web server 4230 to the computing device 400. Accordingly, the computing device 400, in particular the monitor method 4200 may detect use of the web target media service and may generate in-use time stamps of the target media service 402. This embodiment may also be carried out in case the intervention method of the present invention may at least in part be stored on the computing device 400 and in particular on the operating system 408 (not shown in FIG. 4)).

Figure 5:
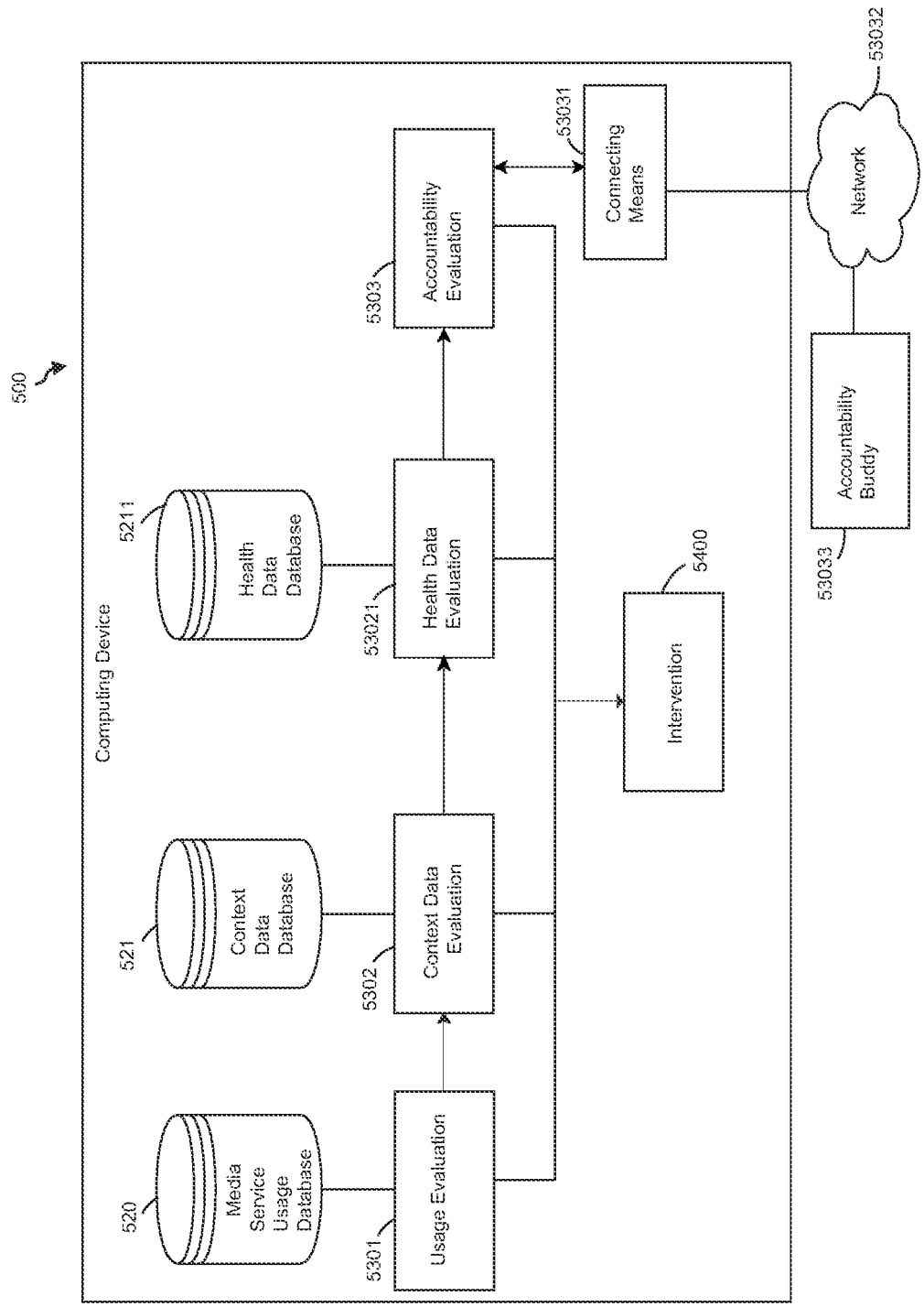
FIG. 5 is a simplified diagram of an extract of an exemplary computing environment suitable for implementing embodiments of the invention relating to alternative or cumulative evaluation steps.

FIG. 5 illustrates a simplified diagram of an extract of an exemplary computing environment suitable for implementing embodiments of the invention relating to alternative or cumulative evaluation steps. In case the monitor step (not shown in FIG. 5) determines that an access request for a target media service (not shown in FIG. 5) is triggered by a user interaction with the computing device 500, the evaluation step may include one or more of the different evaluation steps 5301, 5302, 5303, and/or 5304. As already described in the previous drawings, a first evaluation 5301 regarding determining whether an intervention 5400 shall be conducted with respect to the requested target media service may take place in view of the general user settings, i.e. that the user has identified the respective media service as target media service and the respective activity status and the status regarding completion of a previous intervention with respect to the requested target media service, wherein the data may be provided in the Media Service Usage Database 520. In addition, the evaluation regarding the intervention 5400 may in addition include a Context Data Evaluation step 5302 based on respective Context Data acquired by suitable means and compared to predetermined context data provided in Context Data Database 521. The predetermined context data may include i) predetermined location data of the computing device 500, ii) predetermined data of time of the day at the location of the computing device 500, iii) predetermined health data of the user, iv) predetermined data on performed actions of the user within a predefined time interval prior to the access request of step c), v) predetermined focus mode. In other words, even in case the usage evaluation step 5301 may determine that the intervention shall or shall not be carried out, the context data evaluation step 5302 may overrule the determination of step 5301 and may find that with respect to the specific location of the computing device 500, such as work area, the intervention may nevertheless be carried out. In addition or alternatively, the context data evaluation step 5302 may determine that a specific intervention 5400 shall be carried. As an example, in case the user has performed a predetermined action, such as sport activity, within a predefined time interval prior to the access request for the target media service, the computing device 500 compares this acquired data with the predetermined data in the Context Data Database 5302 and may determine to reward the user with a shorter intervention.

In FIG. 5, the Health Data Evaluation 53021 although in general belonging to the context data evaluation step 5302 is depicted as a separate evaluation step, wherein acquired health data by the computing device may be compared with predetermined health data provided in a Health Data Database 5211. The Health Data Database 5211 may also be provided by the operating system (not shown in FIG. 5), which has direct access to certain health data of the user, such as wake up time, in certain embodiments also to physiological data of the user.

In addition or alternative to the context data evaluation 5302, FIG. 5 shows that an accountability evaluation step 5303 may be conducted, wherein an accountability buddy 53033, e.g. a second user having a computing device connectable to the computing device 500, is connected via a suitable network 53032 and networking connecting device 53031 to the computing device 500 so that the Accountability Evaluation Step 5303 can determine based on the Data provided by the Accountability Buddy 53033 whether an intervention 5400 shall be carried out or not or in case a specific intervention 5400 shall be carried out. Such an embodiment of the present invention may increase the social control and may, thus, further reduce the time of use of a target media service by a user.

Embodiments of the invention have been described to be illustrative rather than restrictive. It will be understood that certain features and sub-combinations are of utility and may be employed without reference to other features and sub-combinations. This is contemplated by and is within the scope of the claims.

What is claimed is:

1. A computer-implemented method to intervene access to a target media service requested by a user, the method comprising:
   a) providing a computing device including one or more computer storage databases and processors, and wherein the computing device comprises computer-executable instructions embodied thereon including computer-executable instructions to carry out a method to intervene access to a target media service requested by a user,
   b) determining a media service to be identified as target media service when access to the media service is to be intervened using the computing device of step a), storing unique target media service identifier data in an identifier database, and storing activity status data of the target media service including time stamp of access request to the target media service and time stamp of closing the target media service in a database as well as storing time stamp of completing intervention for the target media service in a database, respectively,
   c) detecting a user interaction with the computing device of step a) that triggers i) a present access request being a request to access a media service and determining that the requested access is a request to access one of the target media services based on the stored unique target media service identifier data of step b), or ii) a request to close a media service and determining that the requested closing is a request to close one of the target media services based on the stored unique target media service identifier data of step b),
   d) determining that the present access request to the target media service of step c) is to be intervened based on the activity status data for the requested target media service, wherein the present access request to the target media service is only not to be intervened i) when determining that a time interval between the time stamp of the present access request for the target media service and a time stamp of completion of last intervention for the target media service is up to 10 seconds, and ii) when determining that a time interval between the time stamp of the present access request for the target media service and a time stamp of last closing the target media service is up to 5 minutes,
      wherein the time stamp of the present access request for the target media service is only stored in a database in case the access to the target media service is determined to be intervened, and
   e) intervening access to the requested target media service, wherein the intervention is perceivable by the user and is selected from a predetermined intervention parameter stored for the requested target media service on or accessible by the computing device.

2. The method of claim 1, wherein the predetermined intervention parameter comprises data on a duration of an intervention in order to complete the intervention, data on a type of interaction for the user to be carried out in order to complete the intervention, data on a number of interaction types to be carried out by a user to complete the intervention, data whether a re-execution of intervention shall be scheduled when launching the target media service after completing the intervention step e), and data on whether to block access to the requested target media service.

3. The method of claim 1, wherein determining that the intervention is to be carried out in step d) is additionally based on predetermined context data, wherein the context data includes at least one of i) predetermined location data of the computing device, ii) predetermined data of time of the day at the location of the computing device, iii) predetermined health data of the user, iv) predetermined data on performed actions of the user within a predefined time interval prior to the access request of step c), or v) predetermined focus mode.

4. The method of claim 1, wherein the computing device of step a) is further connected and in communication with a second computing device controlled by a second user, wherein in step d) the computing device communicates the present access request to the second computing device so that the second user can modify intervention parameters.

5. The method of claim 1, wherein in step e) the perceivable intervention is selected from at least one of i) displaying an intervention on the computing device or a device connected to the computing device, ii) playing back an audio file from the computing device or a device connected to the computing device, or iii) physically interacting the user and the computing device or a device connected and in communication with the computing device.

6. The method of claim 1, wherein the user selects in the intervention of step e) as an action dismissal of intervention so that the intervention is dismissed and this selected action triggers storage of a time stamp of dismissal of intervention for the requested target media service in a database.

7. The method of claim 1, wherein the intervention is completed in step e) according to the intervention parameters and the user selects in a further method step f) as an action access to the requested target media service so that the target media service is launched on the computing device and this selected action triggers storage of a time stamp for completing intervention of the target media service in a database.

8. The method of claim 1, wherein the user further selects in step e) as an action identification of an intention to use the requested target media service and this selected action triggers storage of identification data for intention to use of the requested target media service in a database and after completing the intervention method step e) the user selects in a further method step f) as an action access to the requested target media service so that the target media service is launched on the computing device and this selected action triggers storage of a time stamp for completing intervention of the target media service in a database.

9. The method of claim 1, wherein the user selects in step e) dismissal of the access to the requested target media service and launch of a selected predetermined healthy media service on the computing device and this selected action triggers storage a time stamp of access request to healthy media service in a database.

10. The method of claim 1, wherein determining in step d) to not intervene access to the target media service triggers determining that at least one of i) an execution of the intervention for the target media service is to be scheduled within a predetermined time and storing this data in a database, ii) a notification to the user about the intention for using the target media service is to be scheduled within a predetermined time and storing this data in a database, or iii) a notification to the user about re-evaluation of further using the target media service is to be scheduled within a predetermined time and storing this data in a database.

11. The method of claim 1, wherein the user interacts with the computing device in order to close the target media service which triggers storing the time stamp of closing the target media service, wherein the time stamp of closing the target media service is not stored in case the time interval between the time stamp of present closing of target media service and the time stamp of last access of the target media service is up to 5 seconds.

12. The method of claim 1, wherein the target media service is selected from at least one of: a media service provided by the operating system of the computing device, an application service installed on the computing device, an application service accessible by the computing device using a connected web server, or a website accessible by the computing device using a connected web server.

13. The method of claim 1, wherein the computing device is selected from at least one of: a smart device including a smart phone, a smart tablet, a smart tv, a smart wearable, such as a smart watch, smart glasses, and smart brain-computer interfaces, a desktop computing device or a laptop computing device.

14. A computer-implemented method to intervene access to a target media service requested by a user, the method comprising:
  a) providing a computing device including one or more computer storage databases and processors, and wherein the computing device comprises computer-executable instructions embodied thereon and wherein computer-executable instructions stored in a non-transitory memory of the computing device are executable by the processors to carry out the method to intervene access to a target media service requested by a user with an operating system of the computing device,
  b) determining a media service to be identified as target media service when access to the media service is to be intervened using the computing device of step a), storing unique target media service identifier data in an identifier database, and storing activity status data of the target media service including time stamp of access request to the target media service in a database as well as storing time stamp of completing intervention for the target media service in a database, respectively,
  c) detecting a user interaction that triggers a present access request, the present access request being a request of the computing device to access a media service and determining that the requested access is a request to access one of the target media services based on the stored unique target media service identifier data of step b),
  d) determining that the present access request to the target media service of step c) is to be intervened based on the activity status data, wherein the present access request to the target media service is only not to be intervened when determining that a time interval between the time stamp of the present access request for the target media service and a time stamp of completion of last intervention for the target media service is up to 10 seconds, wherein the time stamp of the present access request for the target media service is only stored in a database in case the access to the target media service is determined to be intervened, and
  e) intervening access to the requested target media service, wherein the intervention is perceivable by the user and is selected from a predetermined intervention parameter stored for the requested target media service on or accessible by the computing device.

15. The method of claim 14, wherein in step c) a user interaction with the computing device of step a) further triggers a request to close a media service, wherein the activity status data of the target media service also includes a time stamp of closing the target media service and determining that the requested closing is a request to close one of the target media services based on the stored unique target media service identifier data of step b), and wherein in step d) the present access request to the target media service is further not to be intervened when determining that a time interval between the time stamp of the present access request for the target media service and a time stamp of last closing the target media service is up to 5 minutes, wherein the time stamp of the present access request for the target media service is only stored in a database in case the access to the target media service is determined to be intervened.

16. The method of claim 14, wherein the predetermined intervention parameter comprises data on a duration of an intervention in order to complete the intervention, data on a type of interaction for the user to be carried out in order to complete the intervention, data on a number of interaction types to be carried out by a user to complete the intervention, data whether a re-execution of intervention shall be scheduled when launching the target media service after completing the intervention step e), and data on whether to block access to the requested target media service.

17. The method of claim 14, wherein determining that the intervention is to be carried out in step d) is additionally based on predetermined context data, wherein the context data includes at least one of i) predetermined location data of the computing device, ii) predetermined data of time of the day at the location of the computing device, iii) predetermined health data of the user, iv) predetermined data on performed actions of the user within a predefined time interval prior to the access request of step c), or v) predetermined focus mode.

18. The method of claim 14, wherein the computing device of step a) is further connected and in communication with a second computing device controlled by a second user, wherein in step d) the computing device communicates the present access request to the second computing device so that the second user can modify intervention parameters.

19. The method of claim 14, wherein in step e) the perceivable intervention is selected from at least one of i) displaying an intervention on the computing device or a device connected to the computing device, ii) playing back an audio file from the computing device or a device connected to the computing device, or iii) physically interacting the user and the computing device or a device connected and in communication with the computing device.

20. The method of claim 14, wherein the user selects in the intervention of step e) as an action dismissal of intervention so that the intervention is dismissed and this selected action triggers storage of a time stamp of dismissal of intervention for the requested target media service in a database.

21. The method of claim 14, wherein the intervention is completed in step e) according to the intervention parameters and the user selects in a further method step f) as an action access to the requested target media service so that the target media service is launched on the computing device and this selected action triggers storage of a time stamp for completing intervention of the target media service in a database.

22. The method of claim 14, wherein the user further selects in step e) as an action identification of an intention to use the requested target media service and this selected action triggers storage of identification data for intention to use of the requested target media service in a database and after completing the intervention method step e) the user selects in a further method step f) as an action access to the requested target media service so that the target media service is launched on the computing device and this selected action triggers storage of a time stamp for completing intervention of the target media service in a database.

23. The method of claim 14, wherein the user selects in step e) dismissal of the access to the requested target media service and launch of a selected predetermined healthy media service on the computing device and this selected action triggers storage a time stamp of access request to healthy media service in a database.

24. The method of claim 14, wherein determining in step d) to not intervene access to the target media service triggers determining that at least one of i) an execution of the intervention for the target media service is to be scheduled within a predetermined time and storing this data in a database, ii) a notification to the user about the intention for using the target media service is to be scheduled within a predetermined time and storing this data in a database, or iii) a notification to the user about re-evaluation of further using the target media service is to be scheduled within a predetermined time and storing this data in a database.

25. The method of claim 14, wherein the user interacts with the computing device in order to close the target media service which triggers storing the time stamp of closing the target media service, wherein the time stamp of closing the target media service is not stored in case the time interval between the time stamp of present closing of target media service and the time stamp of last access of the target media service is up to 5 seconds.

26. The method of claim 14, wherein the target media service is selected from at least one of: a media service provided by the operating system of the computing device, an application service installed on the computing device, an application service accessible by the computing device using a connected web server, or a website accessible by the computing device using a connected web server.

27. The method of claim 14, wherein the computing device is selected from at least one of: a smart device including a smart phone, a smart tablet, a smart tv, a smart wearable, such as a smart watch, smart glasses, and smart brain-computer interfaces, a desktop computing device or a laptop computing device.

28. The method of claim 14, wherein the operating system comprises instructions to access a media service or part thereof upon request of a user and wherein the operating system is configured to synchronously control intervention of target media services on different inter-connectable computing devices having the same operating system or wherein the operating systems of the different inter-connectable computing devices can connect and communicate with each other.

29. The method of claim 14, wherein the operating system of the computing device is configured to launch the intervention in step e) as a banner screen above a display screen of the requested target media service.

30. The method of claim 14, wherein the operating system of the computing device is configured to abort connections to one or more further devices including web servers in order to prevent loading of new content of a requested target media service after a predetermined time.

31. The method of claim 14, wherein the operating system of the computing device is configured to use an embedded extension of a healthy media service as action to select or to connect to the healthy media service directly for use as part of the intervention.

32. A computing device including processor and memory, wherein the computing device comprises computer-executable program instructions embodied on the computing device that, when executed by the computing device, performs a method to intervene access to a target media service requested by a user comprising:
  a) providing a computing device including one or more computer storage databases and processors, and wherein the computing device comprises computer-executable instructions embodied thereon including computer-executable instructions to carry out a method to intervene access to a target media service requested by a user,
  b) determining a media service to be identified as target media service when access to the media service is to be intervened using the computing device of step a), storing unique target media service identifier data in an identifier database, and storing activity status data of the target media service including time stamp of access request to the target media service and time stamp of closing the target media service in a database as well as storing time stamp of completing intervention for the target media service in a database, respectively,
  c) detecting a user interaction with the computing device of step a) that triggers i) a present access request being a request to access a media service and determining that the requested access is a request to access one of the target media services based on the stored unique target media service identifier data of step b), or ii) a request to close a media service and determining that the requested closing is a request to close one of the target media services based on the stored unique target media service identifier data of step b),
  d) determining that the present access request to the target media service of step c) is to be intervened based on the activity status data for the requested target media service, wherein the present access request to the target media service is only not to be intervened i) when determining that a time interval between the time stamp of the present access request for the target media service and a time stamp of completion of last intervention for the target media service is up to 10 seconds, and ii) when determining that a time interval between the time stamp of the present access request for the target media service and a time stamp of last closing the target media service is up to 5 minutes,
  wherein the time stamp of the present access request for the target media service is only stored in a database in case the access to the target media service is determined to be intervened, and
  e) intervening access to the requested target media service, wherein the intervention is perceivable by the user and is selected from a predetermined intervention parameter stored for the requested target media service on or accessible by the computing device.

33. A computing device including processor and memory, wherein the computing device comprises computer-executable program instructions embodied on the computing device that, when executed by the computing device, performs a method to intervene access to a target media service requested by a user comprising:

a) providing a computing device including one or more computer storage databases and processors, and wherein the computing device comprises computer-executable instructions embodied thereon and wherein computer-executable instructions stored in a non-transitory memory of the computing device are executable by the processors to carry out the method to intervene access to a target media service requested by a user with an operating system of the computing device, b) determining a media service to be identified as target media service when access to the media service is to be intervened using the computing device of step a), storing unique target media service identifier data in an identifier database, and storing activity status data of the target media service including time stamp of access request to the target media service in a database as well as storing time stamp of completing intervention for the target media service in a database, respectively, c) detecting a user interaction that triggers a present access request, the present access request being a request of the computing device to access a media service and determining that the requested access is a request to access one of the target media services based on the stored unique target media service identifier data of step b), d) determining that the present access request to the target media service of step c) is to be intervened based on the activity status data, wherein the present access request to the target media service is only not to be intervened when determining that a time interval between the time stamp of the present access request for the target media service and a time stamp of completion of last intervention for the target media service is up to 10 seconds, wherein the time stamp of the present access request for the target media service is only stored in a database in case the access to the target media service is determined to be intervened, and e) intervening access to the requested target media service, wherein the intervention is perceivable by the user and is selected from a predetermined intervention parameter stored for the requested target media service on or accessible by the computing device.

* * * * *